(12) United States Patent
Tang et al.

(10) Patent No.: US 12,401,968 B2
(45) Date of Patent: Aug. 26, 2025

(54) DEVICE TRACKING DETECTION METHOD AND ELECTRONIC DEVICE

(71) Applicant: Honor Device Co., Ltd., Shenzhen (CN)

(72) Inventors: Nengfu Tang, Shenzhen (CN); Weilin Gong, Shenzhen (CN); Yashu Zhang, Shenzhen (CN); Bin Yan, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 0 days.

(21) Appl. No.: 17/924,219

(22) PCT Filed: May 7, 2022

(86) PCT No.: PCT/CN2022/091338
§ 371 (c)(1),
(2) Date: Nov. 9, 2022

(87) PCT Pub. No.: WO2022/257665
PCT Pub. Date: Dec. 15, 2022

(65) Prior Publication Data
US 2024/0223995 A1   Jul. 4, 2024

(30) Foreign Application Priority Data

Jun. 9, 2021 (CN) .......................... 202110644509.X
Dec. 23, 2021 (CN) .......................... 202111592600.8

(51) Int. Cl.
*H04W 4/029* (2018.01)
*H04W 4/02* (2018.01)
(Continued)

(52) U.S. Cl.
CPC ........... *H04W 4/029* (2018.02); *H04W 4/027* (2013.01); *H04W 4/12* (2013.01); *H04W 4/80* (2018.02)

(58) Field of Classification Search
None
See application file for complete search history.

(56) References Cited

U.S. PATENT DOCUMENTS

2018/0184286 A1* 6/2018 Patterson .............. H04W 12/02
2019/0045332 A1  2/2019 Ye et al.
(Continued)

FOREIGN PATENT DOCUMENTS

CN    103901889 A    7/2014
CN    103997712 A    8/2014
(Continued)

*Primary Examiner* — Mazda Sabouri
(74) *Attorney, Agent, or Firm* — Slater Matsil, LLP

(57) ABSTRACT

This application provides a device tracking detection method and an electronic device, and is related to the field of terminal technologies. The device tracking detection method is applied to a first electronic device. The method includes: determining that the first electronic device is tracked by a Bluetooth peripheral when a moving state successively changes for a plurality of times and there are scanning records of a first type within a preset duration. It can be understood that the first electronic device is accompanied by the Bluetooth peripheral in a plurality of successive different moving states, that is, the Bluetooth peripheral changes with change of the moving state of a user.

18 Claims, 19 Drawing Sheets

(51) Int. Cl.
*H04W 4/12* (2009.01)
*H04W 4/80* (2018.01)

(56) References Cited

U.S. PATENT DOCUMENTS

2019/0073101 A1* 3/2019 Li .......................... G06F 3/0483
2019/0200203 A1* 6/2019 Jiang .................. H04L 63/0861

FOREIGN PATENT DOCUMENTS

| | | |
|---|---|---|
| CN | 205547727 U | 9/2016 |
| CN | 106161791 A | 11/2016 |
| CN | 106572430 A | 4/2017 |
| CN | 107864284 A | 3/2018 |
| CN | 112135259 A | 12/2020 |
| JP | 2010277452 A | 12/2010 |
| KR | 20190064972 A | 6/2019 |

* cited by examiner

DEVICE TRACKING DETECTION METHOD AND ELECTRONIC DEVICE

CROSS-REFERENCE TO RELATED APPLICATIONS

This application is a national stage of International Application No. PCT/CN2022/091338, filed on May 7, 2022, which claims priority to Chinese Patent Application No. 202110644509.X, filed on Jun. 9, 2021, and claims priority to Chinese Patent Application No. 202111592600.8, filed on Dec. 23, 2021. The disclosures of all the aforementioned applications are hereby incorporated by reference in their entireties.

TECHNICAL FIELD

This application relates to the field of terminal technologies, and in particular, to a device tracking detection method and an electronic device.

BACKGROUND

A Bluetooth peripheral is a Bluetooth device that may periodically broadcast a first Bluetooth signal. A user may place a Bluetooth peripheral with items (for example, keys and a backpack) that are carried with the user. The user can obtain location information of the Bluetooth peripheral (that is, location information of an item) to position the item.

In some cases, a user B may place the Bluetooth peripheral in items carried with a user A. The user B can obtain location information of the Bluetooth peripheral. Therefore, the user B can obtain location information of the user A carrying the Bluetooth peripheral, so that itinerary of the user A is tracked. In this way, it is necessary to detect a Bluetooth peripheral located in the items carried with the user A so as to prevent the itinerary of the user A from being tracked. However, accuracy of detecting the Bluetooth peripheral located in the items carried with the user is currently low.

SUMMARY

This application provides a device tracking detection method and an electronic device, to alleviate a problem of low accuracy of detecting a Bluetooth peripheral in items carried with the user.

According to a first aspect, this application provides a device tracking detection method, applied to a first electronic device, where the method includes:

receiving, by the first electronic device, a Bluetooth signal through a first signal filter, where the first signal filter is configured to receive a first Bluetooth signal; storing, by the first electronic device, scanning records of a first type when the first electronic device detects the first Bluetooth signal, where there is a correspondence between the scanning records of the first type and a physical address carried in the first Bluetooth signal; storing scanning records of a second type when the first electronic device detects that a moving state has changed and there are the scanning records of the first type within a previous preset duration, where there is a correspondence between the scanning records of the second type and the physical address carried in the first Bluetooth signal; and outputting, by the first electronic device, alert information for alerting a user of being tracked by a Bluetooth peripheral when a quantity of scanning records of the second type corresponding to the physical address is greater than a first threshold.

In the device tracking detection method provided in this application, when a moving state of the first electronic device changes, it means that a moving state of a user carrying the first electronic device has changed once. In this case, when the first electronic device receives the first Bluetooth signal within the preset duration before the moving state has changed, meaning that the user is accompanied by the Bluetooth peripheral (that is, a distance between the Bluetooth peripheral and the user is within a preset range), the first electronic device obtains the scanning records of the second type. When the quantity of records of the second type obtained by the first electronic device is greater than a number threshold, it means that the user carrying the first electronic device is accompanied by the Bluetooth peripheral in a plurality of successive moving states. In this case, the first electronic device determines that it is tracked by the Bluetooth peripheral. It can be understood that when the user carrying the first electronic device is accompanied by the Bluetooth peripheral in a plurality of successive moving states, that is, a moving state of the Bluetooth peripheral changes with change of the moving state of the user. This can be interpreted as "things move with people", which is more in line with logical common sense that the user carrying the first electronic device is tracked by the Bluetooth peripheral. In this way, the first electronic device outputs alert information for alerting of being tracked by the Bluetooth peripheral, with high reliability.

In an optional implementation, before the receiving, by the first electronic device, a Bluetooth signal through a first signal filter, the method further includes: enabling, by the first electronic device, a preset mode, where in the preset mode, the first electronic device is capable of receiving the first Bluetooth signal based on the first signal filter.

It can be understood that the first electronic device receives the first Bluetooth signal only in the preset mode, which can save power consumption and better meet user needs.

Further, the enabling, by the first electronic device, a preset mode includes: displaying, by the first electronic device, a first screen, where the first screen includes a first control; and enabling, by the first electronic device, the preset mode in response to a trigger operation by the user on the first control.

In this way, the user can enable the preset mode by triggering the first control in the first screen, which is convenient and quick.

Still further, the first screen is a system desktop, and the displaying, by the first electronic device, a first screen includes: displaying, by the first electronic device, the system desktop in response to the trigger operation by the user, where the system desktop includes a first prompt box, and the first prompt box includes the first control; and enabling, by the first electronic device, the preset mode in response to an enabling operation by the user on the first control.

In this way, the user can enable the preset mode simply from the system desktop, which is convenient and quick.

Alternatively, still further, the displaying, by the first electronic device, a first screen includes: displaying, by the first electronic device, a system desktop, where the system desktop includes a "settings" icon; displaying, by the first electronic device, the first screen in response to a trigger operation by the user on the "settings" icon, where the first screen includes the first control; and enabling, by the first electronic device, the preset mode in response to an enabling operation by the user on the first control.

In this way, the user can enable the preset mode at any time after triggering the "settings" icon, which is convenient and quick.

In an optional implementation, the storing, by the first electronic device, scanning records of a first type when the first electronic device detects the first Bluetooth signal includes: generating, by the first electronic device, the scanning records of the first type when the first electronic device detects the first Bluetooth signal; and inserting, by the first electronic device, the scanning records of the first type into a preset first data table, where in the first data table, there is a correspondence between the scanning records of the first type and the physical address carried in the first Bluetooth signal.

In this way, the scanning records of the first type generated when the first Bluetooth signals broadcast by different Bluetooth peripherals are received may be distinguished by using the first data table.

In an optional implementation, the storing scanning records of a second type when the first electronic device detects that a moving state has changed and there are the scanning records of the first type within a previous preset duration includes: generating the scanning records of the second type when the first electronic device detects that the moving state has changed and there are the scanning records of the first type within the previous preset duration; and inserting, by the first electronic device, the scanning records of the second type into a preset second data table, where in the second data table, there is a correspondence between the scanning records of the second type and the physical address carried in the first Bluetooth signal.

In this way, the scanning records of the second type generated when the first Bluetooth signals broadcast by different Bluetooth peripherals are received may be distinguished by using the first data table.

Further, the scanning records of the first type include location information and times when the first Bluetooth signals are received, and the scanning records of the second type include location information and times in the scanning records of the first type present within the previous preset duration.

Still further, the outputting, by the first electronic device, alert information for alerting a user of being tracked by a Bluetooth peripheral when a quantity of scanning records of the second type corresponding to the physical address is greater than a first threshold includes: identifying whether a distance indicated in a set of location information included in the second data table is greater than a preset distance threshold; when the distance is greater than the preset distance threshold, identifying whether a duration indicated in a set of times included in the second data table is greater than a preset duration threshold; when the duration is greater than the preset duration threshold, identifying whether the quantity of scanning records of the second type in the second data table is greater than the first threshold; and when the quantity is greater than the first threshold, outputting, by the first electronic device, alert information for alerting the user of being tracked by the Bluetooth peripheral.

The first electronic device is accompanied by the Bluetooth peripheral in more than a preset threshold number of moving states, more in line with a pattern that the first electronic device is tracked by the Bluetooth peripheral. When the distance indicated in the set of location information included in a set of scanning records of the second type is greater than the preset distance threshold, it is further in line with the pattern that the first electronic device is tracked by the Bluetooth peripheral. Therefore, in combination of the foregoing 3 conditions, a determination of being tracked by the Bluetooth peripheral is more reliable.

In an optional implementation, the outputting, by the first electronic device, alert information for alerting a user of being tracked by a Bluetooth peripheral includes: popping up, by the first electronic device, a first notification in a navigation bar of a second screen that is being displayed; and displaying, by the first electronic device, the alert information in response to a pull-down operation by the user on the navigation bar.

In this way, the user only needs to perform a pull-down operation on the navigation bar to perceive the alert information, which is convenient and quick.

Further, the alert information also includes a second control, and after the alert information is displayed, the method further includes: establishing, by the first electronic device, a Bluetooth connection with the Bluetooth peripheral based on the physical address carried in the first Bluetooth signal in response to a trigger operation by the user on the second control; and controlling, by the first electronic device, the Bluetooth peripheral to perform a function of alerting.

In this way, after the Bluetooth peripheral performs the function of alerting, the user can determine a location of the Bluetooth peripheral more conveniently.

In a possible implementation, the outputting, by the first electronic device, alert information for alerting a user of being tracked by a Bluetooth peripheral includes: controlling, by the first electronic device, a motor of the first electronic device to vibrate; or controlling, by the first electronic device, a speaker of the first electronic device to output an alert tone; or controlling, by the first electronic device, a light indicator of the first electronic device to blink; or when the alert information is control command, sending, by the first electronic device, a control command to a wearable device with which a communication connection has been established, to control the wearable device to vibrate or output an alert tone.

In an optional implementation, the storing scanning records of a second type when the first electronic device detects that a moving state has changed and there are the scanning records of the first type within a previous preset duration includes: detecting, by the first electronic device, whether the moving state has changed; and detecting whether there is a scanning record of the first type within the previous preset duration when the moving state has changed; and if yes, storing the scanning records of the second type.

Further, the detecting, by the first electronic device, whether the moving state has changed includes: obtaining, by the first electronic device, target information, where the target information is information indicating the moving state of the first electronic device; and detecting, by the first electronic device based on the target information, whether the moving state has changed.

Still further, the detecting, by the first electronic device based on the target information, whether the moving state has changed includes: when the target information is moving speed, obtaining, by the first electronic device based on a moving state monitor, a moving speed of the first electronic device, and when a speed range of the moving speed has changed, determining, by the first electronic device, that the moving state has changed; or when the target information is posture parameter, monitoring, by the first electronic device based on a moving state monitor, the posture parameter, inputting, by the first electronic device, the posture parameter into a moving state identification model so that the moving state identification model outputs the moving state based on the posture parameter, and when the moving states of two adjacent outputs are different, determining that the moving state has changed; or when the target information is itinerary information recorded in an application program, obtaining, by the first electronic device, the itinerary information recorded in the application program, where the itinerary information indicates that the first electronic device is in a target moving state during a target period, and when the first electronic device determines that the target period is reached, determining, by the first electronic device, that the moving state has changed.

According to a second aspect, this application further provides a device tracking detection method, applied to a first electronic device, where the method includes: receiving, by the first electronic device, a Bluetooth signal through a first signal filter when it is detected that a moving state has changed, where the first signal filter is configured to receive the first Bluetooth signal; storing, by the first electronic device, scanning records of a second type when the first electronic device detects the first Bluetooth signal, where there is a correspondence between the scanning records of the second type and a physical address carried in the first Bluetooth signal; and outputting, by the first electronic device, alert information for alerting a user of being tracked by a Bluetooth peripheral when a quantity of scanning records of the second type corresponding to the physical address is greater than a first threshold.

In an optional implementation, the receiving, by the first electronic device, a Bluetooth signal through a first signal filter when it is detected that a moving state has changed includes: enabling, by the first electronic device, a timer upon detecting that the moving state has changed; receiving, by the first electronic device, the Bluetooth signal through the first signal filter; and stopping receiving, by the first electronic device, the Bluetooth signal upon expiration of the timer, where a timing duration of the timer is greater than a period during which the Bluetooth peripheral broadcasts the first Bluetooth signal.

According to a third aspect, an embodiment of this application further provides a device tracking detection apparatus, applied to a first electronic device. The apparatus includes: a communications unit, configured to receive a Bluetooth signal through a first signal filter, where the first signal filter is configured to receive a first Bluetooth signal; and a processing unit, configured to store scanning records of a first type when the first Bluetooth signal is detected, where there is a correspondence between the scanning records of the first type and a physical address carried in the first Bluetooth signal. The processing unit is further configured to store scanning records of a second type when the first electronic device detects that a moving state has changed and there are the scanning records of the first type within a previous preset duration, where there is a correspondence between the scanning records of the second type and the physical address carried in the first Bluetooth signal. The processing unit is further configured to output alert information for alerting a user of being tracked by a Bluetooth peripheral when a quantity of scanning records of the second type corresponding to the physical address is greater than a first threshold.

According to a fourth aspect, this application further provides a device tracking detection apparatus, applied to a first electronic device. The apparatus includes: a communications unit, configured to receive a Bluetooth signal through a first signal filter when it is detected that a moving state has changed, where the first signal filter is configured to receive a first Bluetooth signal; and a processing unit, configured to store scanning records of a second type when the first Bluetooth signal is detected, where there is a correspondence between the scanning records of the second type and a physical address carried in the first Bluetooth signal. The processing unit is further configured to output alert information for alerting a user of being tracked by a Bluetooth peripheral when a quantity of scanning records of the second type corresponding to the physical address is greater than a first threshold.

According to a fifth aspect, an embodiment of this application provides a device tracking detection apparatus, including a central processing unit and a memory, where the memory is configured to store a code instruction, and the central processing unit is configured to run the code instruction, so that the electronic device is caused to perform the device tracking detection method described in any one of the first aspect or the implementations of the first aspect or the second aspect.

According to a sixth aspect, an embodiment of this application provides a computer-readable storage medium. The computer-readable storage medium stores an instruction. When the instruction is executed, a computer is caused to perform the device tracking detection method described in any one of the first aspect or the implementations of the first aspect or the second aspect.

According to a seventh aspect, an embodiment of this application further provides a computer program product, including a computer program. When the computer program is run, a computer is caused to perform the device tracking detection method described in any one of the first aspect or the implementations of the first aspect or the second aspect.

It should be understood that the second aspect to the seventh aspect of this application correspond to the technical solutions of the first aspect of this application, and the beneficial effects obtained by each aspect and corresponding feasible implementations are similar and will not be repeated herein again.

DETAILED DESCRIPTION OF ILLUSTRATIVE EMBODIMENTS

To clearly describe technical solutions in embodiments of this application, terms such as "first" and "second" are used in the embodiments of this application to distinguish between same items or similar items that have basically the same functions or purposes. For example, a first value and a second value are merely intended to distinguish between different values, but not to limit a sequential order thereof. A person skilled in the art may understand that the terms such as "first" and "second" do not limit a quantity and an execution sequence, and the terms such as "first" and "second" do not indicate a definite difference.

It should be noted that, in this application, terms such as "an example" or "for example" are used to indicate an example, an illustration, or an explanation. Any embodiment or design solution described by using "an example" or "for example" in this application should not be construed as being more preferred or advantageous than other embodiments or design solutions. To be precise, the terms such as "an example" or "for example" are intended to present a related concept in a specific manner.

In this application, "at least one" means one or more, and "a plurality of" means two or more. The term "and/or" describes an association relationship between associated objects, and indicates that three relationships may exist. For example, A and/or B may represent the following cases: only A, both A and B, and only B, where A and B may be singular or plural. The character "/" generally indicates an "or" relationship between associated objects before and after the character. "At least one of the following items (objects)" or a similar expression means any combination of these items, including a single item (object) or any combination of a plurality of items (objects). For example, at least one of a, b, or c may indicate: a, b, c, a and b, a and c, b and c, or a, b, and c, where a, b, and c may be singular or plural.

A Bluetooth peripheral is a Bluetooth device that may periodically broadcast a first Bluetooth signal. A user may place a Bluetooth peripheral with items (for example, keys and a backpack) that are carried with the user. The user can obtain location information of the Bluetooth peripheral (that is, location information of an item) to position the item.

Figure 1:
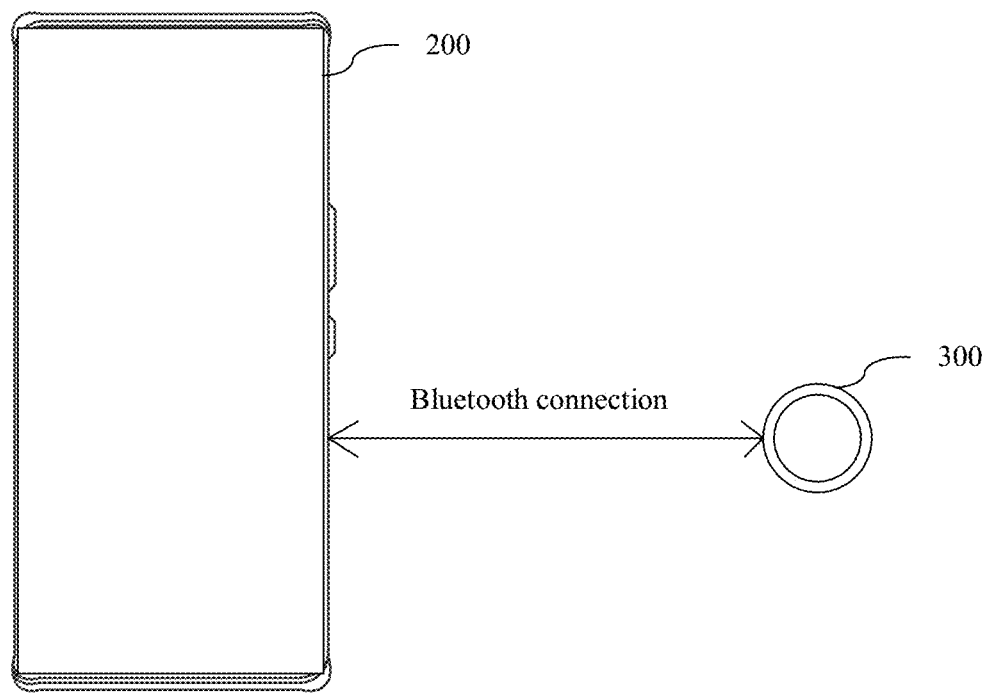
FIG. 1 is a schematic interaction diagram of a Bluetooth connection between a mobile phone 200 with a Bluetooth peripheral 300.

As shown in FIG. 1, a user may establish a Bluetooth connection between a mobile phone 200 and a Bluetooth peripheral 300. When the user cannot find an item that he/she carries, the user can find a location of the Bluetooth peripheral 300 by using the mobile phone 200 to position the item that is placed with the Bluetooth peripheral 300.

Figure 2:
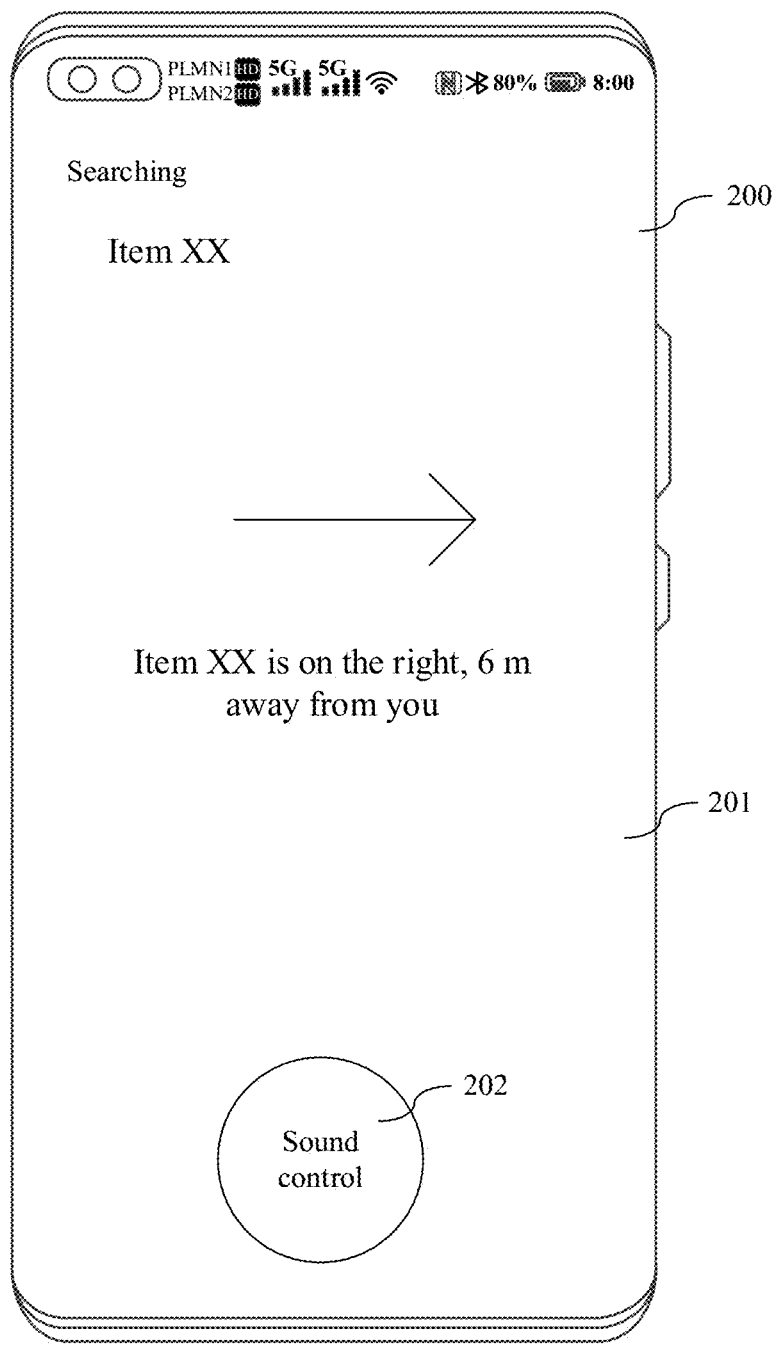
FIG. 2 is a schematic screen diagram of an item positioning screen 201 on the mobile phone 200 displaying location information of the Bluetooth peripheral 300.

On one hand, still as shown in FIG. 1, when the mobile phone 200 remains connected with the Bluetooth peripheral 300, the mobile phone 200 can receive a first Bluetooth signal broadcast by the Bluetooth peripheral. Then, after a search function of the mobile phone 200 is triggered by the user, the mobile phone 200 detects for location information of the Bluetooth peripheral 300 based on the first Bluetooth signal, and then displays an item positioning screen 201 shown in FIG. 2, with "Item XX is on the right, 6 m away from you" shown in the item positioning screen 201. In other words, the item positioning screen 201 displays the location information of the item. In addition, the item positioning screen 201 further includes a sound control button 202. The mobile phone 200 may also control the Bluetooth peripheral 300 to sound in response to a trigger operation by the user on the sound control button 202, to assist the user to find an item that is placed with the Bluetooth peripheral 300.

Figure 3:
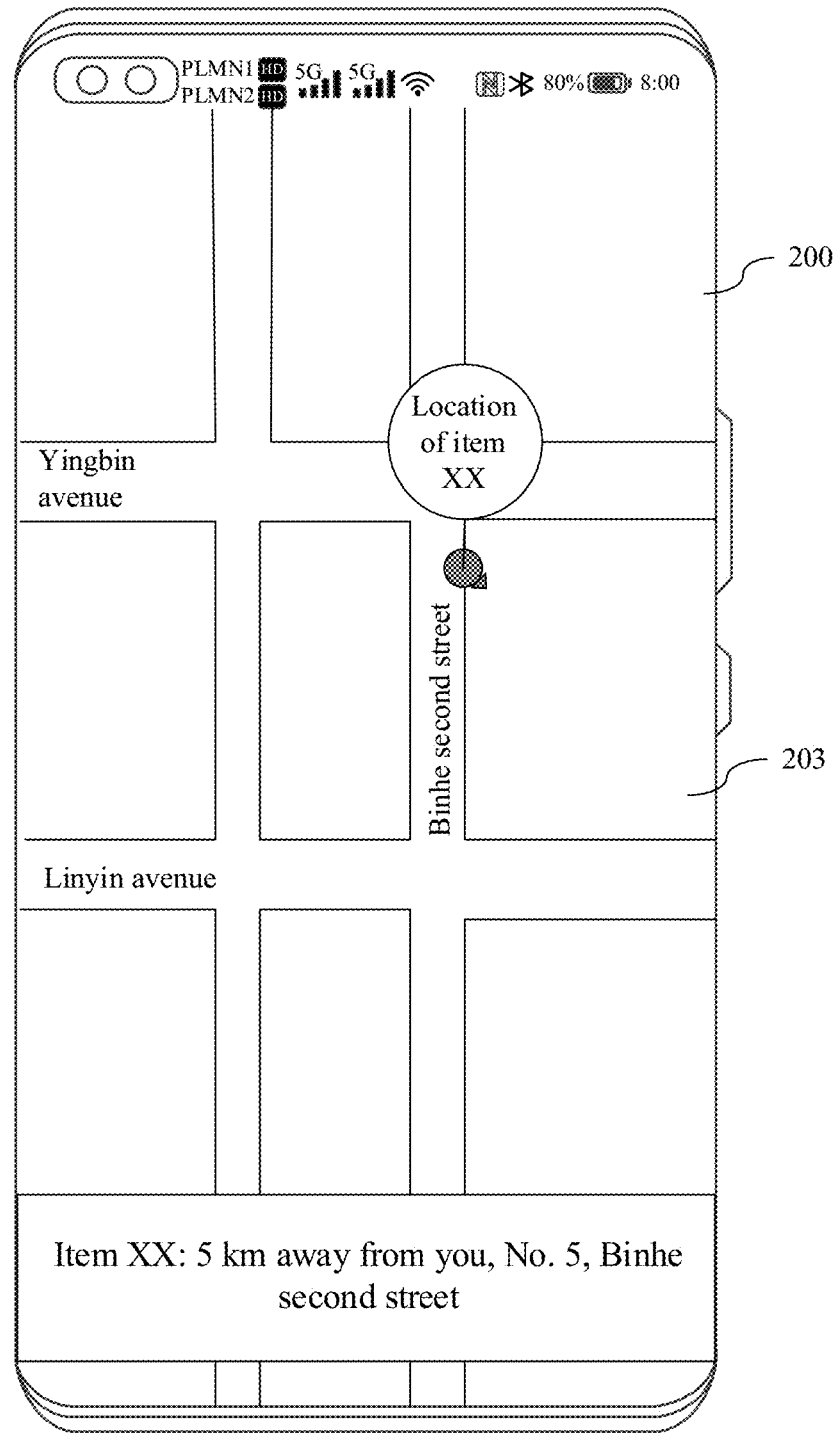
FIG. 3 is a schematic screen diagram of an item positioning screen 203 on the mobile phone 200 displaying location information of an electronic device.

On the other hand, when the mobile phone 200 is disconnected from the Bluetooth peripheral 300, an electronic device within a preset distance from the Bluetooth peripheral 300 can receive the first Bluetooth signal broadcast by the Bluetooth peripheral, and send location information of the electronic device to a cloud server. After the search function of the mobile phone 200 is triggered by the user, the mobile phone 200 obtains the location information of the electronic device from the cloud server. Then, an item positioning screen 203 shown in FIG. 3 is displayed. The location information of the electronic device in a map is displayed in the item positioning screen 203. Because the electronic device is within the preset distance from the Bluetooth peripheral 300, the user can infer a location of the Bluetooth peripheral 300 by using the location information of the electronic device, to facilitate retrieval of a lost item.

However, there are certain security risks associated with applications for the Bluetooth peripheral, that is, a user may use such a Bluetooth peripheral to track another user. For example, if a user B places his/her Bluetooth peripheral in a specific item, for example a vehicle or a clothing pocket, of a user A, the user A moves around with the Bluetooth peripheral without knowledge. As a result, the user B can inquire the cloud server for location information of the electronic device within the preset distance from the Bluetooth peripheral. Then, the user B can infer location information of the Bluetooth peripheral from the inquired location information of the electronic device, thereby implementing tracking of the user A. In this way, the Bluetooth peripheral that tracks the user A needs to be identified.

Figure 4:
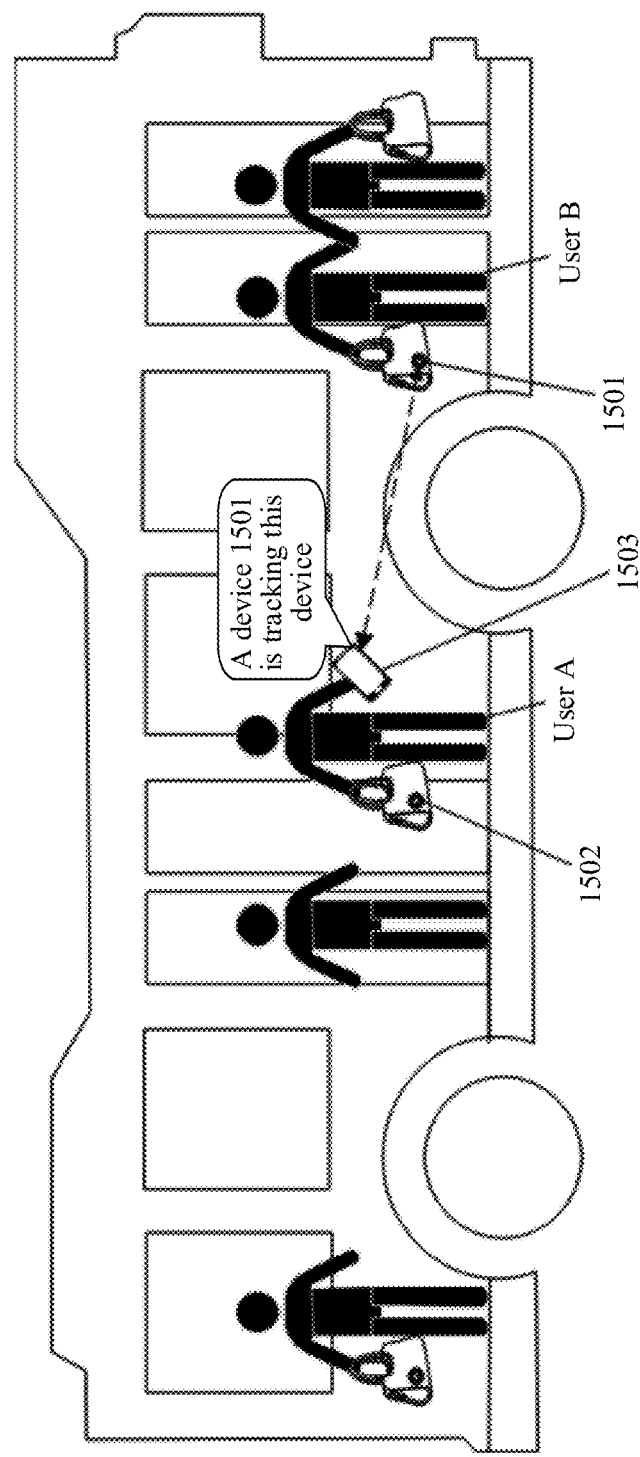
FIG. 4 is a schematic diagram of a scenario in which a user carrying a first Bluetooth peripheral and a first electronic device rides a bus.

As shown in FIG. 4, a user A carrying a handbag and a first electronic device 1503 and a user B carrying a handbag travel on a same bus. The handbag of the user A contains a first Bluetooth peripheral 1502, the handbag of the user B contains a second Bluetooth peripheral 1501, and the first Bluetooth peripheral 1502 is a legitimate device authenticated by the first electronic device 1503. Both the first Bluetooth peripheral 1502 and the second Bluetooth peripheral 1501 periodically broadcast Bluetooth signals to surroundings. In this way, the first electronic device 1503 of the user A can continuously detect the Bluetooth signals broadcast by the second Bluetooth peripheral 1501 located in the handbag of the user B. Therefore, it is determined that the first electronic device 1503 is tracked by the second Bluetooth peripheral 1501.

However, in fact, the first electronic device 1503 of the user A and the second Bluetooth peripheral 1501 of the user B are just on the same bus, and there is no tracking behavior. That is, the first electronic device 1503 of the user A determines that it is tracked by the second Bluetooth peripheral 1501, which is a falsely determined result with low accuracy.

In view of this, this application provides a device tracking detection method, applied to a first electronic device. The method includes: determining that the first electronic device is tracked by the Bluetooth peripheral when a moving state successively changes for a plurality of times and there are scanning records of a first type within a preset duration. It can be understood that the first electronic device is accompanied by the Bluetooth peripheral in a plurality of successive different moving states, that is, the Bluetooth peripheral changes with change of the moving state of the user. This can be interpreted as "things move with people", which is more in line with logical common sense that the first electronic device is tracked by the Bluetooth peripheral. In this way, the first electronic device determines that it is tracked by the Bluetooth peripheral with high accuracy.

Figure 5:
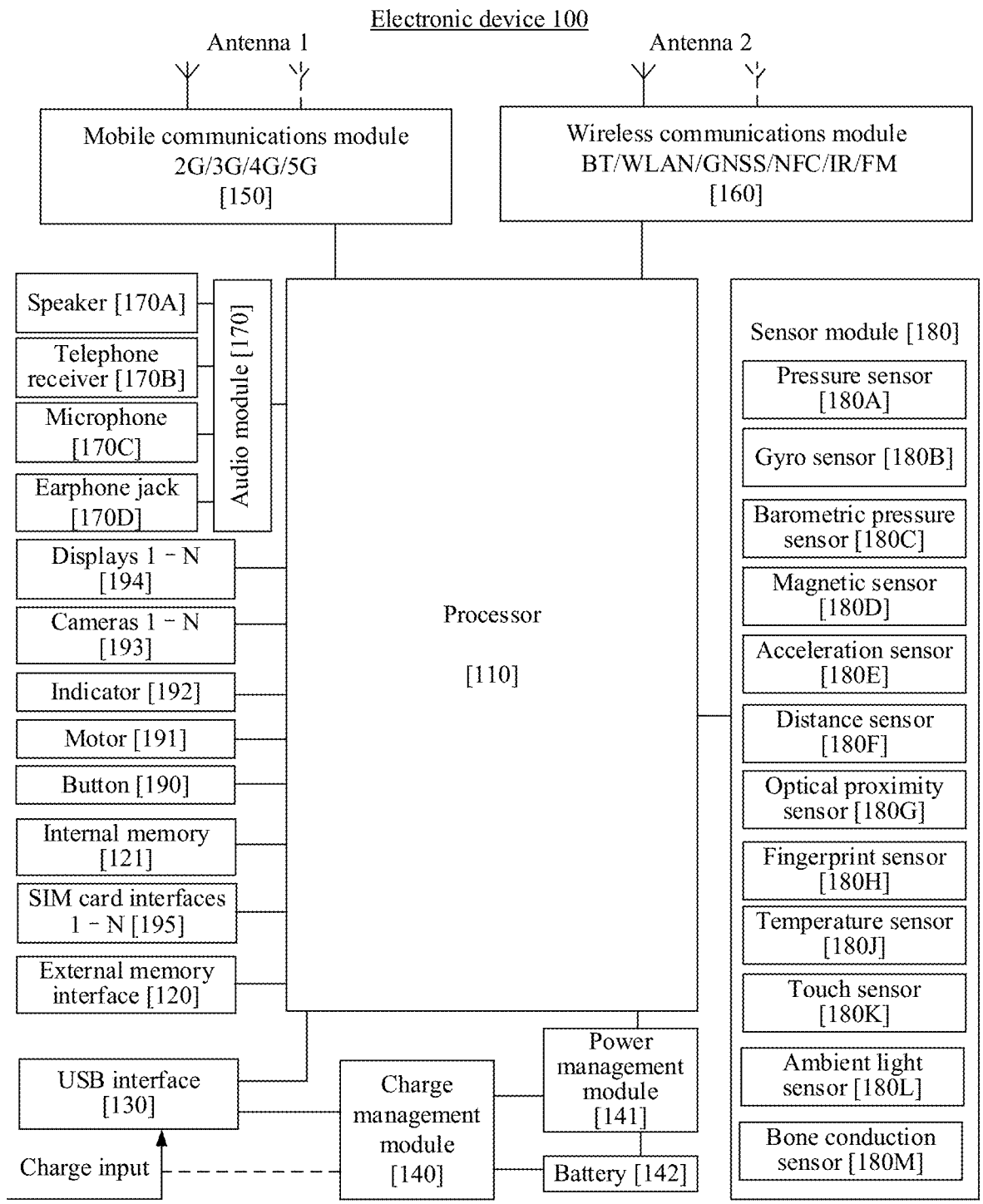
FIG. 5 is a schematic diagram of a hardware structure of a first electronic device according to an embodiment of this application.

The device tracking method provided in this application may be applicable to a first electronic device 100 with a Bluetooth function. FIG. 5 is a schematic structural diagram of the first electronic device 100 with the Bluetooth function. The first electronic device 100 may be a mobile phone, a tablet computer, or the like.

As shown in FIG. 5, the first electronic device 100 may include: a processor 110, an external memory interface 120, an internal memory 121, a universal serial bus (universal serial bus, USB) interface 130, a charge management module 140, a power management module 141, a battery 142, an antenna 1, an antenna 2, a mobile communications module 150, a wireless communications module 160, an audio module 170, a speaker 170A, a telephone receiver 170B, a microphone 170C, an earphone jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, a neural-network processing unit (neural-network processing unit, NPU), and/or the like. Different processing units may be separate devices or may be integrated into one or more processors.

A memory may be further provided in the processor 110 to store instructions and data. In some embodiments, the memory in the processor 110 is a cache memory. The memory may store instructions or data that the processor 110 has just used or used repeatedly. If the processor 110 needs to use the instructions or the data again, the processor 110 may directly call the instructions or the data from the memory, thereby avoiding repeated access, reducing waiting time of the processor 110, and improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface, MIPI), a general-purpose input/output (general-purpose input/output, GPIO) interface, a subscriber identity module (subscriber identity module, SIM) interface, a universal serial bus (universal serial bus, USB) interface, and/or the like.

A wireless communication function of the first electronic device 100 may be implemented by using the antenna 1, the antenna 2, the mobile communications module 150, the wireless communications module 160, the modem processor, the baseband processor, and the like.

The antenna 1 and the antenna 2 are configured to transmit and detect an electromagnetic wave signal. Each antenna of the first electronic device 100 may be configured to cover one or more communication bands. Different antennas may each be used for multiple purposes to improve antenna utilization. For example, the antenna 1 may also be used as a diversity antenna of a wireless local area network. In some other embodiments, the antenna may be used in combination with a tuning switch.

The mobile communications module 150 may provide wireless communication solutions including 2G, 3G, 4G, and 5G for application to the first electronic device 100. The mobile communications module 150 may include at least one filter, a switch, a power amplifier, a low noise amplifier (low noise amplifier, LNA), and the like. The mobile communications module 150 may detect an electromagnetic wave through the antenna 1, perform processing such as filtering and amplification on the detected electromagnetic wave, and transmit the processed electromagnetic wave to the modem processor for demodulation. The mobile communications module 150 may further amplify a signal modulated by the modem processor, and convert the signal into an electromagnetic wave through the antenna 1 for transmission. In some embodiments, at least some functional modules of the mobile communications module 150 may be provided in the processor 110. In some embodiments, at least some functional modules of the mobile communications module 150 and at least some modules of the processor 110 may be provided in a same device.

The modem processor may include a modulator and a demodulator. The modulator is configured to modulate a low frequency baseband signal that is to be sent into a medium or high frequency signal. The demodulator is configured to demodulate a detected electromagnetic wave signal into a low frequency baseband signal. Then, the demodulator transmits the low frequency baseband signal obtained through demodulation to the baseband processor for processing. After being processed by the baseband processor, the low frequency baseband signal is transferred to the application processor. The application processor outputs a sound signal through an audio output device (not limited to the speaker 170A, the telephone receiver 170B, and the like), or displays an image or a video through the display 194. In some embodiments, the modem processor may be a separate device. In some other embodiments, the modem processor may be separate from the processor 110 and provided in a same device together with the mobile communications module 150 or another functional module.

The wireless communications module 160 may provide a wireless communication solution to be applied to the first electronic device 100, which includes a wireless local area network (wireless local area networks, WLAN) (for example, a wireless fidelity (wireless fidelity, Wi-Fi) network), Bluetooth (bluetooth, BT), a global navigation satellite system (global navigation satellite system, GNSS), frequency modulation (frequency modulation, FM), near field communication (near field communication, NFC), an infrared (infrared, IR) technology, and the like. The wireless communications module 160 may be one or more devices integrating at least one communication processing module. The wireless communications module 160 detects an electromagnetic wave through the antenna 2, performs frequency modulation and filtering processing on the electromagnetic wave signal, and transmits the processed signal to the processor 110. The wireless communications module 160 may also detect a to-be-transmitted signal from the processor 110, perform frequency modulation and amplification on the signal, and convert the signal into an electromagnetic wave through the antenna 2 for transmission. For example, the wireless communications module 160 may include a Bluetooth module, a Wi-Fi module, and the like.

In some embodiments, in the first electronic device 100, the antenna 1 is coupled to the mobile communications module 150, and the antenna 2 is coupled to the wireless communications module 160, so that the first electronic device 100 can communicate with a network and other devices by using a wireless communications technology. The wireless communications technology may include global system for mobile communications (global system for mobile communications, GSM), general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, GNSS, WLAN, NFC, FM, an IR technology, and/or the like. The GNSS may include the global positioning system (global positioning system, GPS), the global navigation satellite system (global navigation satellite system, GLONASS), the Beidou navigation satellite system (beidou navigation satellite system, BDS), the quasi-zenith satellite system (quasi-zenith satellite system, QZSS), and/or satellite based augmentation systems (satellite based augmentation system, SBAS).

In this embodiment of this application, the wireless communications module 160 specifically may include a Bluetooth module and a satellite positioning module.

The Bluetooth module may provide a Bluetooth communications solution for application to the first electronic device 100. The Bluetooth module includes a Bluetooth controller. The Bluetooth controller is a chip integrated in the Bluetooth module and can control the Bluetooth module to scan for a Bluetooth signal and report a received Bluetooth signal to the processor 110.

In some embodiments, the Bluetooth module can periodically receive a first Bluetooth signal sent by a Bluetooth peripheral, and then report the first Bluetooth signal sent by the Bluetooth peripheral to the processor 110 of the first electronic device 100. After receiving the first Bluetooth signal from the Bluetooth peripheral, the processor 110 sends location information of the first electronic device 100 to a cloud server. The Bluetooth module receives the first Bluetooth signal from the Bluetooth peripheral, meaning that the Bluetooth peripheral is near the first electronic device 100. Therefore, the location information reported by the first electronic device 100 is equivalent to location information of the Bluetooth peripheral.

In some embodiments, the processor 110 may configure one or more signal filters for the Bluetooth controller. The Bluetooth controller uses a first signal filter of a plurality of signal filters to filter out a first Bluetooth signal from received Bluetooth signals and reports the filtered-out first Bluetooth signal to the processor 110, thereby triggering the processor 110 to record the location information.

The satellite positioning module may determine, based on a positioning system such as the global positioning system (Global Positioning System, GPS) or the Beidou system, a geographic location of the first electronic device 100, that is, the latitude and longitude of a location of the first electronic device 100.

The first electronic device 100 implements a display function by using the GPU, the display 194, the application processor, and the like. The GPU is an image processing microprocessor, and is connected to the display 194 and the application processor. The GPU is configured to perform mathematics and geometrical calculation for graphics rendering. The processor 110 may include one or more GPUs that execute program instructions to generate or change display information.

The display 194 is configured to display an image, a video, and the like. The display 194 includes a display panel. The display panel may use a liquid crystal display (liquid crystal display, LCD), organic light-emitting diodes (organic light-emitting diode, OLED), active-matrix organic light emitting diodes or active-matrix organic light emitting diodes (active-matrix organic light emitting diode, AMO-LED), flexible light-emitting diodes (flex light-emitting diode, FLED), Miniled, MicroLed, Micro-oLed, quantum dot light emitting diodes (quantum dot light emitting diodes, QLED), or the like. In some embodiments, the first electronic device 100 may include one or N displays 194, where N is a positive integer greater than 1.

The first electronic device 100 may implement a shooting function by using the ISP, the camera 193, the video codec, the GPU, the display 194, the application processor, and the like.

The internal memory 121 may be configured to store computer executable program code, where the executable program code includes an instruction. The internal memory 121 may include a storage program area and a storage data area. The storage program area may store an operating system, an application required by at least one function (for example, a sound play function and an image play function), and the like. The data storage area may store data (such as audio data and contacts) created during use of the first electronic device 100, and the like. In addition, the internal memory 121 may include a high-speed random access memory, or may include a non-volatile memory such as at least one magnetic disk storage device, a flash memory device, and a universal flash storage (universal flash storage, UFS). The processor 110 runs the instructions stored in the internal memory 121 and/or the instructions stored in the memory that is provided in the processor, to execute various functional applications and data processing of the first electronic device 100.

The foregoing is a specific description of this embodiment of this application made by using the first electronic device 100 as an example. It should be understood that the structure illustrated in this embodiment of this application does not constitute a specific limitation on the first electronic device 100. The first electronic device 100 may have more or fewer components than those shown in the figure, may combine two or more components, or may have different component configurations. Each component shown in the figure may be implemented in hardware that includes one or more signal processing and/or application-specific integrated circuits, in software, or in a combination of the hardware and the software.

Figure 6:
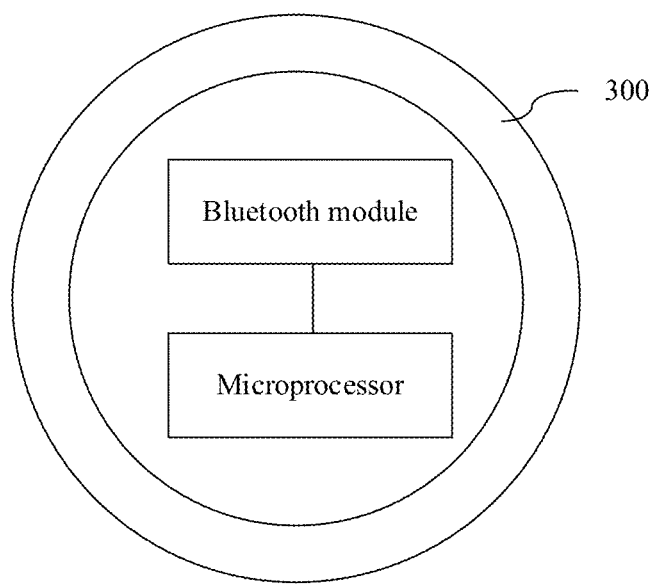
FIG. 6 is a schematic structural diagram of a Bluetooth peripheral according to an embodiment of this application.

Explanation of patent terms in this application:

Bluetooth peripheral: This Bluetooth peripheral is a Bluetooth device that may periodically broadcast a first Bluetooth signal. A user may place a Bluetooth peripheral with items (for example, keys and a backpack) that are carried with the user. The user can obtain location information of the Bluetooth peripheral (that is, location information of an item) to position the item. As shown in FIG. 6, the Bluetooth peripheral 300 includes a Bluetooth module and a Bluetooth controller. The Bluetooth controller is configured to periodically control the Bluetooth module to broadcast a first Bluetooth signal.

In some possible embodiments, the Bluetooth peripheral may be a small device with a Bluetooth function. For example, the Bluetooth peripheral in this embodiment of this application may specifically be a product named AirTag® released by Apple, or may be other Bluetooth peripherals with similar functions developed based on an Android system.

First electronic device: This device may be user equipment (user equipment, UE), for example, a mobile phone, a tablet computer, a desktop computer, a laptop computer, a handheld computer, a netbook, and a personal digital assistant (personal digital assistant, PDA). In addition, the first electronic device also has a function of receiving the first Bluetooth signal.

Second electronic device: a device that can be used to position the Bluetooth peripheral. The second electronic device is capable of continuously broadcasting a second Bluetooth signal. The second Bluetooth signal carries state information of the second electronic device. In this way, the state information may include information such as location information (for example, a base station identifier), battery level, and whether the Bluetooth function is normal.

Hash table: a data table that is accessed directly based on a key value (Key value). That is, in a hash table, a record is accessed by mapping a key value to a location in the table to speed up lookup. For example, given a table M, there is a function f(key). For any given keyword value key, if an address of a record containing the keyword in the table can be obtained after substituting the function, the table M is referred to as a hash table.

Figure 7A:
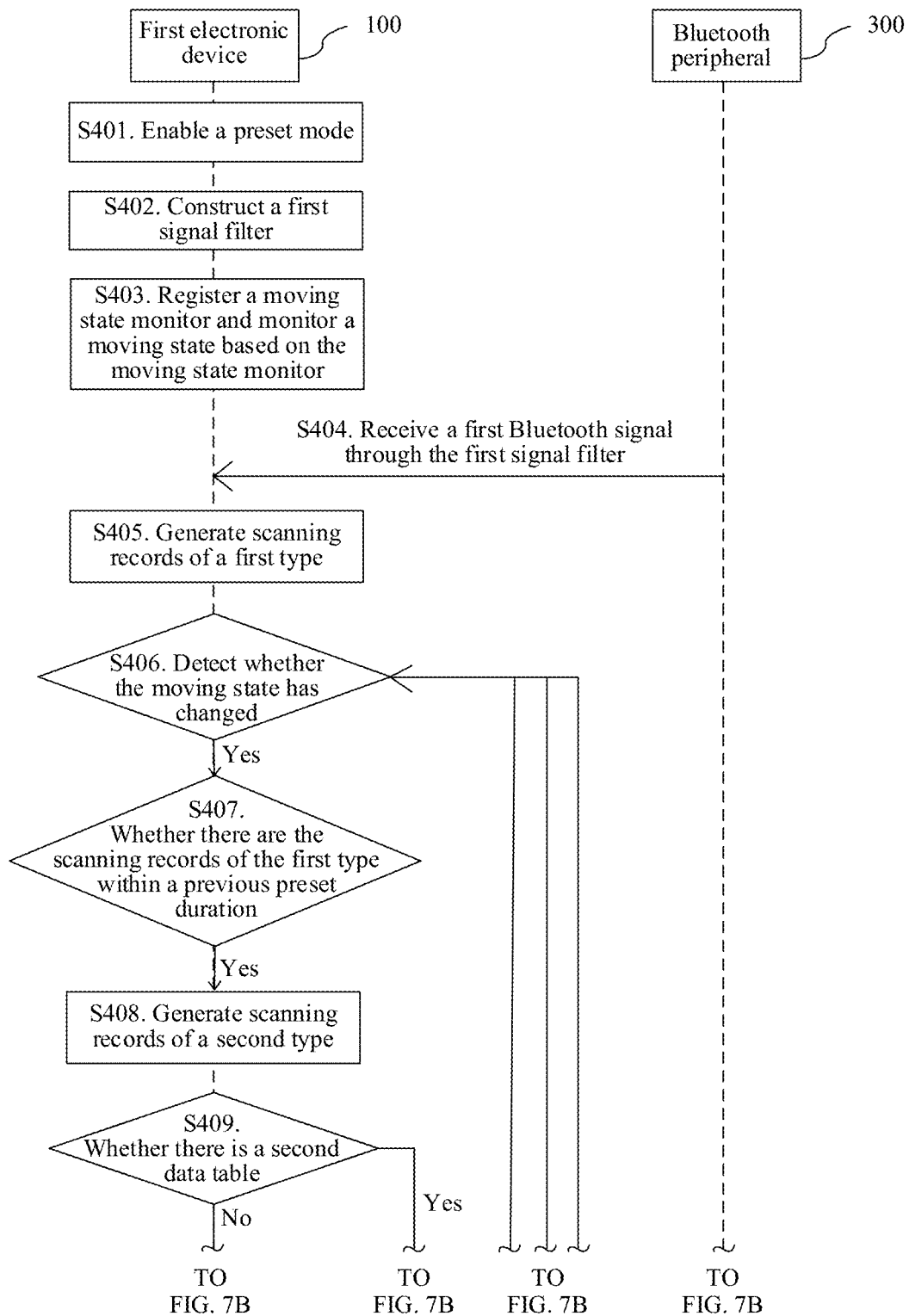
FIG. 7A and FIG. 7B are a first flowchart of a device tracking detection method according to an embodiment of this application.
Figure 7B:
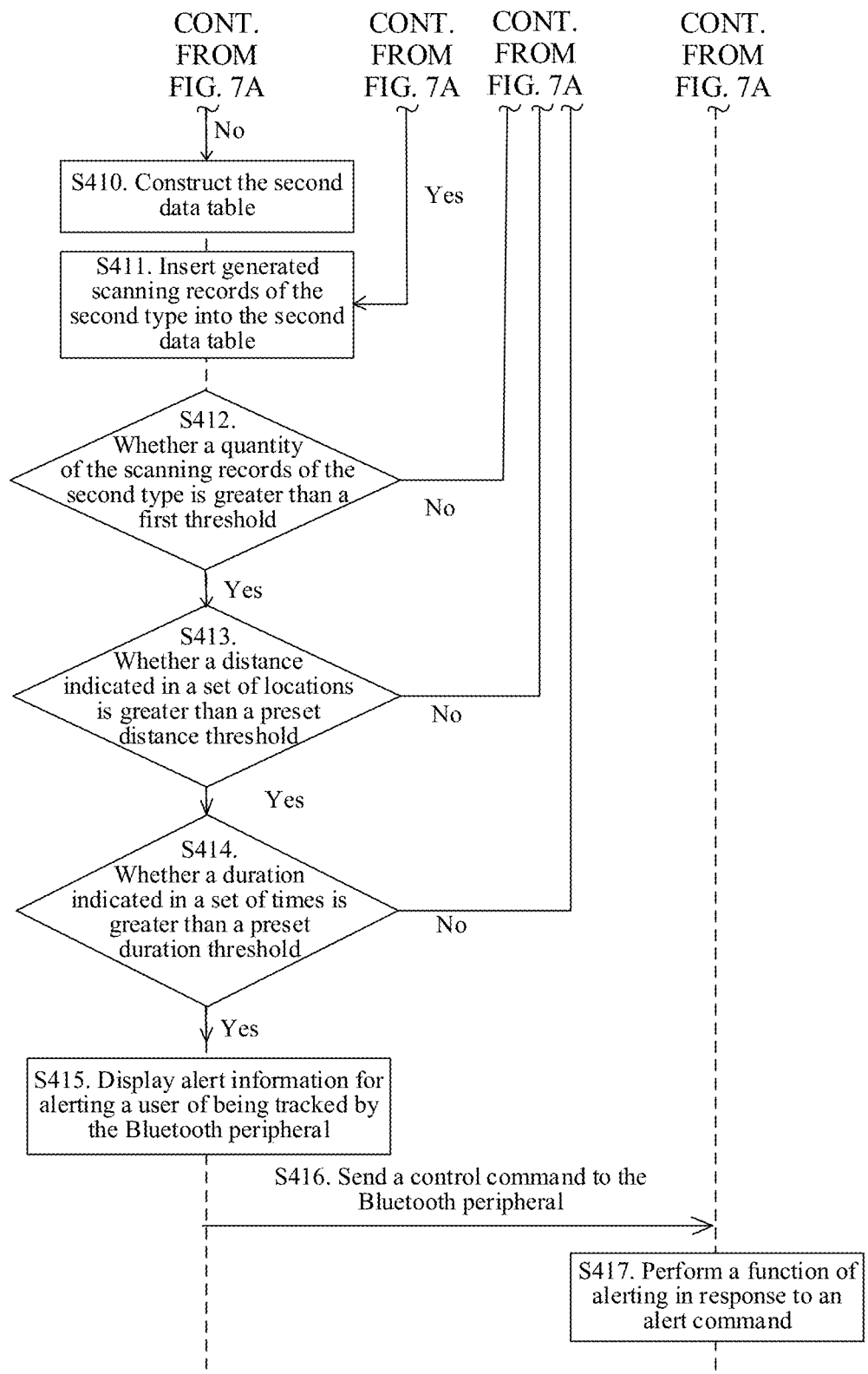

In the following, technical solutions in this application and how the technical solutions in this application resolve the foregoing technical problems are described in detail. Following several specific embodiments may be implemented separately or in combination, and same or similar concepts or processes may be omitted in some of the embodiments. Referring to FIG. 7A and FIG. 7B, a device tracking detection method provided in an embodiment of this application may be performed by the first electronic device 100. The device tracking detection method provided in this embodiment of this application may specifically include the following steps.

S401. The first electronic device 100 enables a preset mode, where the first electronic device 100 is capable of receiving a first Bluetooth signal in the preset mode.

It can be understood that the first electronic device 100 receives the first Bluetooth signal only in the preset mode, which can save power consumption and better meet user needs.

In some embodiments, the first electronic device 100 may display a first screen. The first screen includes a first control, and the first control is used to enable or disable the preset mode. In this way, the first electronic device 100 enables the preset mode in response to an enabling operation by a user on the first control. The preset mode can be understood as a "tracking detection mode". In this way, the user can enable the preset mode by triggering the first control in the first screen, which is convenient and quick.

Figure 8:
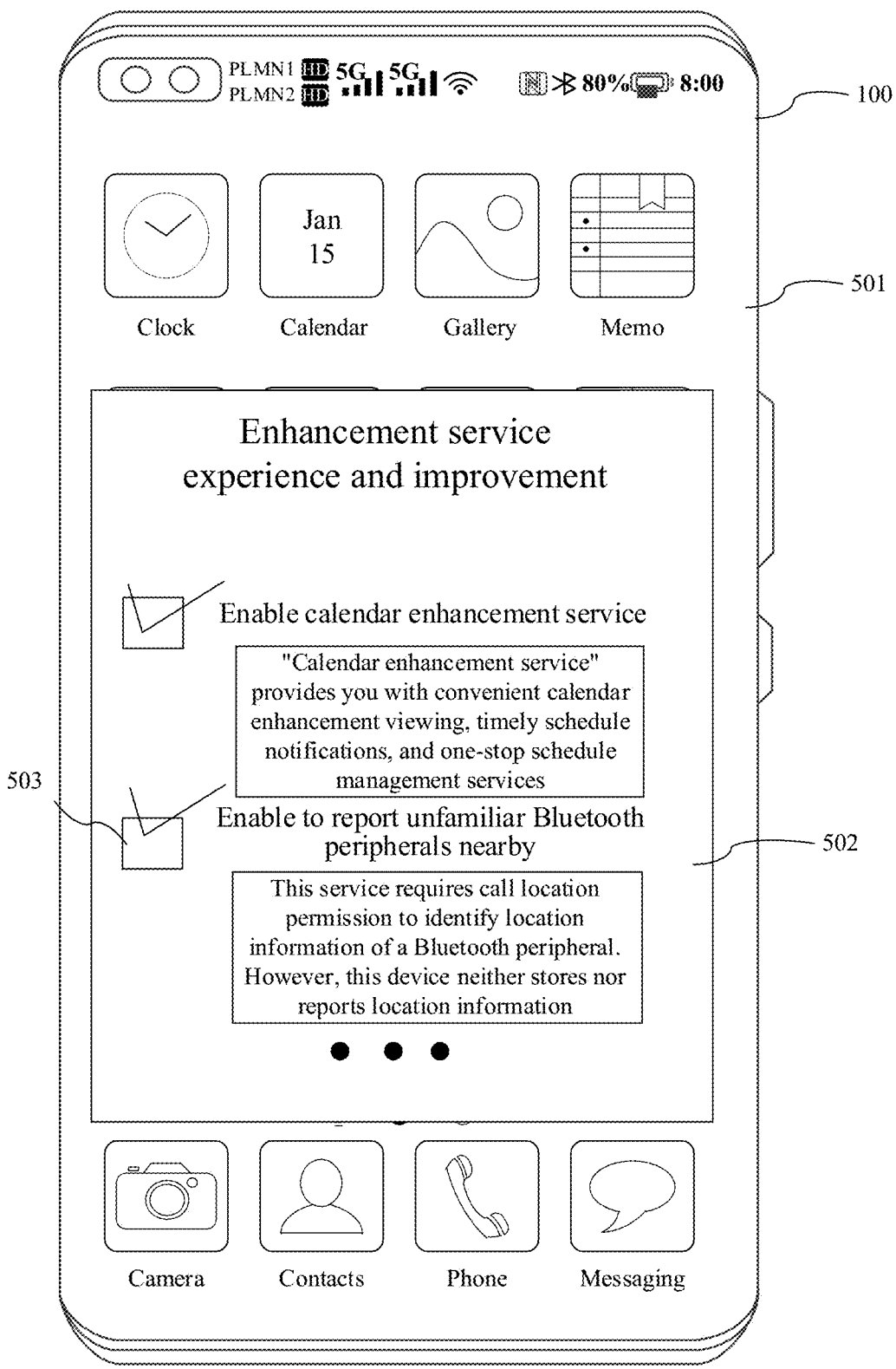
FIG. 8 is a first schematic screen diagram of enabling a preset mode according to an embodiment of this application.

For example, as shown in FIG. 8, when the first electronic device 100 is powered on for the first time after leaving the factory, the first electronic device displays a system desktop 501 in response to an unlocking operation by the user on a lock screen (not shown in the figure). The first electronic device 100 displays the system desktop 501 (that is, the first screen). Then, the first electronic device 100 displays a first prompt box 502 on the system desktop 501. The first prompt box 502 includes a first control 503. The first control 503 includes text information "Enable to report unfamiliar Bluetooth peripherals 300 nearby" on one side, that is, the first control 503 is used to enable or disable a preset mode. The first electronic device 100 can enable the preset mode in response to an enabling operation by the user on the first control 503. In this way, the user can enable the preset mode simply from the system desktop 501, which is convenient and quick.

Figure 9:
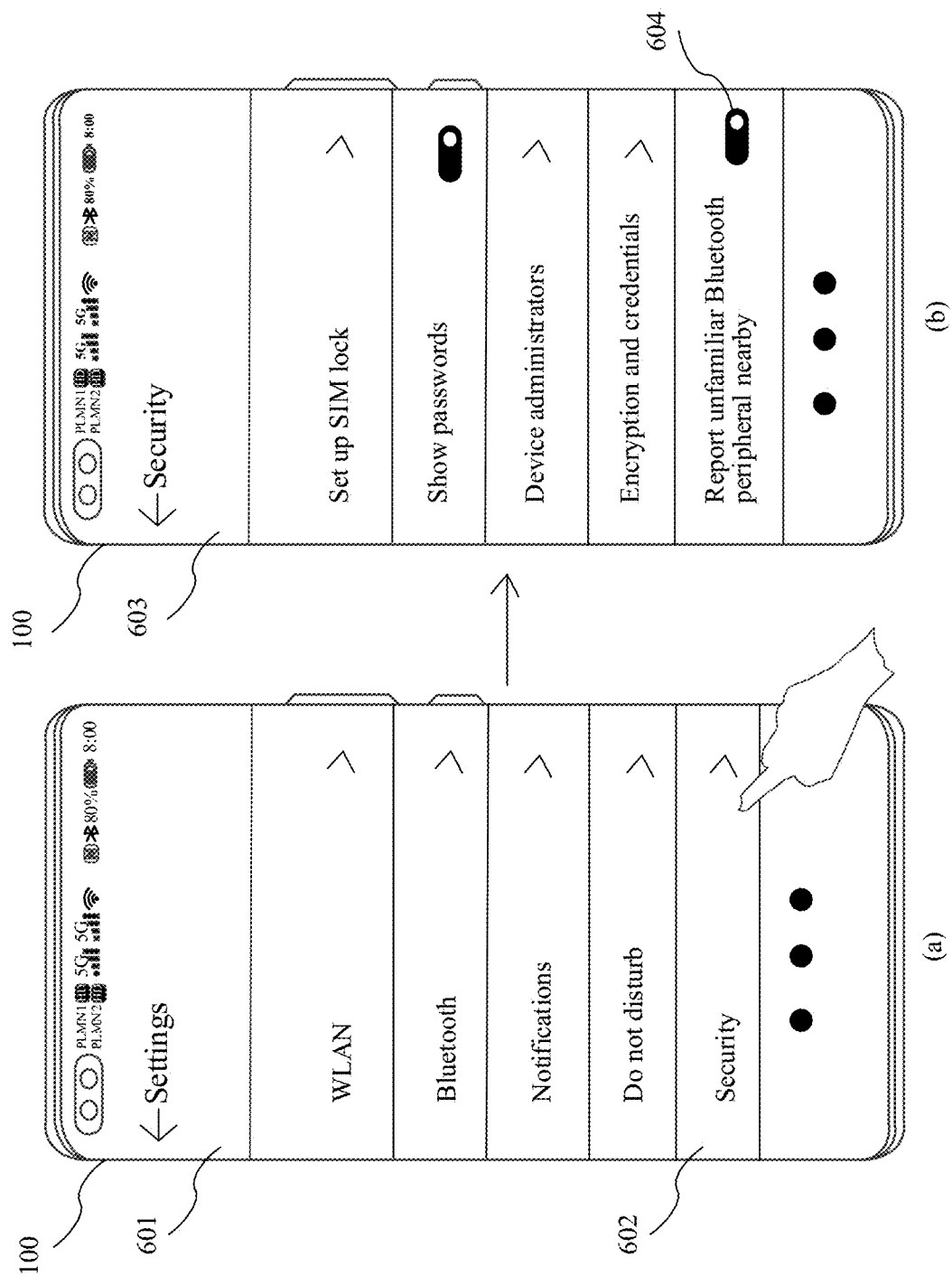
FIG. 9 is a second schematic screen diagram of enabling a preset mode according to an embodiment of this application.

For another example, as shown in (a) of FIG. 9, the first electronic device 100 may display a function list screen 601 in response to a trigger operation by the user on the "settings" icon on the system desktop. The function list screen 601 includes a security setting option 602. The first electronic device 100 may display a security function list screen 603 (that is, the first screen) in response to a trigger operation by the user on the security setting option 602. As shown in (b) of FIG. 9, the security function list screen 603 includes a first control 604. The first control 604 includes text information "Report unfamiliar Bluetooth peripherals 300 nearby" on one side, that is, the first control 604 is used to indicate enabling or disabling of a preset mode. The first electronic device 100 can enable the preset mode in response to an enabling operation by the user on the first control 604. In this way, the user can enable the preset mode at any time after triggering the "settings" icon, which is convenient and quick.

In some other embodiments, in step S401, the first electronic device 100 may alternatively enable the preset mode after detecting that the user lights up the screen, or directly enable the preset mode after the first electronic device 100 is powered on, which is not limited herein.

In addition, the first electronic device 100 may alternatively be in the preset mode by default. In this case, the foregoing S401 may be omitted.

S402. The first electronic device 100 constructs a first signal filter.

The method provided in this embodiment of this application needs to be implemented based on the first Bluetooth signal received by the first electronic device 100. The first Bluetooth signal refers to any one of the Bluetooth signals broadcast by the Bluetooth peripheral 300. Therefore, in step S402, the first electronic device 100 needs to construct a corresponding first signal filter for the first Bluetooth signal, and then configure the first signal filter for a Bluetooth controller of the first electronic device 100, so that the Bluetooth controller of the first electronic device 100 starts scanning for Bluetooth signals, and uses the first signal filter to identify the first Bluetooth signal from a plurality of received Bluetooth signals. Then, the first electronic device 100 can determine whether there is the Bluetooth peripheral 300 within a specified distance around based on whether the first Bluetooth signal is detected.

The first electronic device 100 can construct the first signal filter as follows: When the first electronic device 100 needs to obtain the first Bluetooth signal, the first electronic device 100 may call a filter constructor provided by the operating system of the first electronic device 100, and input characteristic data of the first Bluetooth signal into the filter constructor, thereby constructing the first signal filter for the first Bluetooth signal. Each time the first electronic device 100 receives a Bluetooth signal, the Bluetooth signal may be compared with each configured signal filter, and if it is found that the Bluetooth signal carries one piece of characteristic information of the first signal filter, the first electronic device 100 can identify that the Bluetooth signal is a signal of a type corresponding to the first signal filter, that is, the first Bluetooth signal broadcast by the Bluetooth peripheral 300.

The characteristic data of the first Bluetooth signal may include but is not limited to a Bluetooth peripheral name, a MAC address of the Bluetooth peripheral 300, service data, manufacturer data, and the like. It can be understood that the characteristic data may also include other types of data, which are not limited in this embodiment of this application. The service data is used to indicate a function of the first Bluetooth signal, and the manufacturer data is used to indicate a manufacturer of a device that has sent the first Bluetooth signal. For example, the first signal filter may be a Findmy filter.

In some other embodiments, the first electronic device 100 may be pre-configured with the first signal filter so that the foregoing S402 may be omitted.

S403. The first electronic device 100 registers a moving state monitor and monitors a moving state based on the moving state monitor.

The moving state monitor is located at a framework layer of a software system of the first electronic device 100. The moving state monitor is configured to monitor a moving state of the first electronic device 100.

It should be noted that there is no precedence between S402 and S403. It can be understood that the moving state monitor may alternatively be pre-registered by the first electronic device 100, and therefore, S403 may be omitted.

S404. The first electronic device 100 receives the first Bluetooth signal through the first signal filter.

It can be understood that when the Bluetooth peripheral 300 is within a specified distance threshold of the first electronic device 100, the first electronic device 100 can receive, through the first signal filter, the first Bluetooth signal broadcast by the Bluetooth peripheral 300 every other preset duration (for example, 6 seconds).

S405. The first electronic device 100 generates scanning records of a first type, where there is a correspondence between the scanning records of the first type and a physical address carried in the first Bluetooth signal.

In some optional embodiments, the first electronic device 100 may receive, through the first signal filter, first Bluetooth signals broadcast by a plurality of Bluetooth peripherals 300. Each of the first Bluetooth signals carries a physical address. It can be understood that physical addresses carried in the first Bluetooth signals broadcast by different Bluetooth peripherals 300 are different. Therefore, by identifying the physical address carried in each of the first Bluetooth signal, the first electronic device 100 may distinguish the first Bluetooth signals from different Bluetooth peripherals 300. The physical address may be a MAC address or the like, which is not limited herein.

In addition, after receiving the first Bluetooth signal, the first electronic device 100 records location information and a time when the first Bluetooth signal is received (that is, a scanning record of a first type). In this way, a corresponding first data table can be created for the physical addresses carried in the first Bluetooth signals, and location information and a time when the first Bluetooth signal is received that are recorded each time can be inserted into the first data table. Obviously, in the first data table, a set of scanning records of the first type is a moving trajectory of the Bluetooth peripheral 300 (that is, the first data table can be interpreted as a trajectory list of the Bluetooth peripheral 300).

For example, the first data table could be a hashtable table, that is, a hash table. In the hash table, a physical address of the Bluetooth peripheral 300 may be a "key" of the hashtable table, and recorded location information and time may be "values" of the hashtable table. Specific content of the first data table may be shown in Table 1 below.

TABLE 1

| Physical address | Location information | Time |
| --- | --- | --- |
| MAC address 1 | Cell ID1 | 09:00:00 |
|  | Cell ID2 | 09:00:06 |
|  | Cell ID2 | 09:00:12 |
|  | . . . | . . . |
|  | Cell IDn | 09:30:00 |

In addition, in this embodiment of this application, the scanning records of the first type may alternatively be stored in another way. For example, the scanning records of the first type are stored in a form of a data queue, which is not limited herein.

In addition, on the premise of not missing the physical address broadcast by the Bluetooth peripheral 300, the foregoing manner of receiving the first Bluetooth signal can reduce a working time of a Bluetooth module of the first electronic device 100, thereby reducing energy consumption of the first electronic device 100. For example, when the preset duration is 6 seconds, a period of receiving the first Bluetooth signal may be set to 4 seconds.

It should be noted that the recorded location information may be a base station identifier. During moving, the first electronic device 100 may continuously obtain communications signals broadcast by base stations within a specified distance, where the communications signal broadcast by the base station carries the base station identifier. The base station identifier can be used to indicate a geographical location of the base station. In this way, the recorded location information may be the base station identifier.

For example, methods for obtaining the base station identifier include but are not limited to the following two methods:

First method: The first electronic device 100 may actively search for a base station and record a base station identifier of a searched base station as first location information. In some possible embodiments, the first electronic device 100 may detect a plurality of base stations and correspondingly obtain a plurality of base station identifiers, such as cellID1, cellID2, and cellID3. When the plurality of base stations are detected, the first electronic device 100 may obtain a base station identifier of a base station with a strongest signal strength. For example, the first electronic device 100 may actively search for a base station through a mobile communications module shown in FIG. 5.

Second method: The first electronic device 100 may obtain a base station identifier of a base station on which the first electronic device 100 is camping. For example, the first electronic device 100 may read, through a monitoring interface (phone listener) of the mobile communications module shown in FIG. 5, the base station identifier of the base station on which the first electronic device 100 is camping.

S406. The first electronic device 100 detects whether the moving state of the first electronic device 100 has changed, and if yes, the first electronic device 100 performs S407.

The first electronic device 100 may detect the moving state by the following manner: obtaining target information based on the moving state monitor, where the target information is information indicating the moving state of the first electronic device 100.

It can be understood that when the first electronic device 100 is carried with the user, the moving state of the first electronic device 100 changes with a moving state of the user, where there may be many types of moving states. For example, the moving states include a stationary state, a walking state, a running state, a driving state, a high-speed train state, and the like, which are not limited herein.

In some embodiments, the target information may include a moving speed of the first electronic device 100. Specifically, the first electronic device 100 may detect the moving state by the following manner: measuring, by the first electronic device 100, a moving speed of the first electronic device 100 based on the moving state monitor. If the first electronic device 100 detects that the moving speed is in a first preset interval (for example, [0 m/s, 0.2 m/s]) for a specified duration (for example, 2 minutes or 3 minutes), the moving state is determined to be the stationary state. If the first electronic device 100 detects that the moving speed is in a second preset interval (for example, [0.5 m/s, 3 m/s]) for a specified duration, the moving state is determined to be the walking state. If the first electronic device 100 detects that the moving speed is in a third preset interval (for example, [3 m/s, 10 m/s]) for a specified duration, the moving state is determined to be the running state. If the first electronic device 100 detects that the moving speed is in a fourth preset interval (for example, [10 m/s, 33 m/s]) for a specified duration, the moving state is determined to be the driving state. If the first electronic device 100 detects that the moving speed is in a fifth preset interval (for example, [34 m/s, 11 m/s]) for a specified duration, the moving state is determined to be the high-speed train state.

In this way, when the first electronic device 100 detects that the moving speed switches from one preset interval to another preset interval within a specified duration and remains for a specified duration, it may be determined that the moving state of the first electronic device 100 has changed. For example, when the first electronic device 100 detects that the moving speed switches from the first preset interval to the second preset interval and remains for 2 minutes, it is determined that the first electronic device 100 has switched from the stationary state to the walking state. For another example, when the first electronic device 100 detects that the moving speed switches from the second preset interval to the third preset interval within a specified duration and remains for 2 minutes, it is determined that the first electronic device 100 has switched from the walking state to the running state.

In some other embodiments, the target information may alternatively include a posture parameter of the first electronic device 100. The first electronic device 100 may detect the moving state alternatively by the following manner: monitoring, by the first electronic device 100 based on the moving state monitor, the posture parameter; and inputting, by the first electronic device 100, the posture parameter into a pre-trained moving state identification model, so that the moving state identification model outputs the moving state based on the posture parameter.

In some other embodiments, the foregoing S403 may also be omitted. For example, the target information may alternatively be itinerary information recorded in an application program. In this way, the first electronic device 100 may detect the moving state alternatively by the following manner: determining, by the first electronic device 100 based on the itinerary information recorded in the application program, the moving state of the user. For example, the user buys a high-speed train ticket for a target period in a ticket buying application (that is, recorded itinerary information). In this way, when a current time is in the target period, the first electronic device 100 determines that the user is in a state of riding a high-speed train (that is, a target moving state). For another example, a message record by the user in a messaging application or instant chat application includes "The user rides a high-speed train in the target period". In this way, when the current time is in the target period, the first electronic device 100 determines that the user is in a state of riding a high-speed train. For another example, the user records an itinerary in a calendar application: The user rides a high-speed train in the target period. In this way, when the current time is in the target period, the first electronic device 100 determines that the user is in a state of riding a high-speed train.

To further accurately and reliably determine that the user is in the state of riding the high-speed train, the first electronic device 100 may also obtain location information (for example, a GPS position) of the first electronic device 100 during the target period. When the location information indicates a location along a high-speed rail, the first electronic device 100 determines that the user is in the state of riding a high-speed train.

S407. The first electronic device 100 inquires whether there is a scanning record of the first type within a previous preset duration, and if yes, the first electronic device 100 performs S408.

It can be understood that the first electronic device 100 inquires whether there is a scanning record of the first type within the previous preset duration, that is, an implementation of the first electronic device 100 determining whether the first Bluetooth signal is detected within the previous preset duration. If there is a scanning record of the first type within the previous preset duration, it means that the first Bluetooth signal is detected within the previous preset duration. In other words, after the moving state of the first electronic device 100 changes, the first electronic device 100 is accompanied by the Bluetooth peripheral 300.

S408. The first electronic device 100 generates scanning records of a second type, where there is a correspondence between the scanning records of the second type and the physical address carried in the first Bluetooth signal.

Content of the scanning records of the second type may include: the moving state of the first electronic device 100, the inquired location information of the Bluetooth peripheral device 300, and the time when the first Bluetooth signal is received.

S409. The first electronic device 100 inquires whether there is a second data table corresponding to the physical address carried in the first Bluetooth signal, if no, the first electronic device 100 performs S410, or if yes, the first electronic device 100 performs S411.

S410. The first electronic device 100 constructs the second data table, where the second data table is used to store the scanning records of the second type. Then, the first electronic device 100 performs S411.

Similarly, to distinguish the scanning records of the second type corresponding to different Bluetooth peripherals 300, a corresponding second data table for storing the scanning records of the second type may be created for the physical address in this first data table (that is, the physical address carried in the first Bluetooth signals received within the previous preset duration). It can be understood that there is a correspondence between the physical address carried in the first Bluetooth signals received within the previous preset duration and the scanning records of the second type.

S411. The first electronic device 100 inserts the generated scanning records of the second type into the second data table.

In the second data table, there is a correspondence between the physical address carried in the first Bluetooth signals and the inserted scanning records of the second type. In this way, the scanning records of the second type generated when the first Bluetooth signals broadcast by different Bluetooth peripherals are received may be distinguished by using the second data table.

For example, the second data table may also be a hash table. In this way, in the second data table, the physical address carried in the first Bluetooth signals is used as a "key", and times and location information of the first electronic device 100 when the first Bluetooth signals are received within the previous preset duration and an item composed of the changed moving states (that is, the scanning records of the second type) are used as "values". Content of the second data table may be shown in Table 2 below.

TABLE 2

| Physical address | Location information | Time | Moving state |
|---|---|---|---|
| MAC address 1 | Cell ID1 | 09:00:00 | Walking state |
| | Cell ID50 | 09:30:06 | Stationary state |
| | Cell ID120 | 09:45:12 | State of riding a bus |
| | . . . | . . . | . . . |
| | Cell IDn | 10:30:00 | Walking state |

In addition, in this embodiment of this application, the scanning records of the second type may alternatively be stored in another way. For example, the scanning records of the second type are stored in a form of a data queue, which is not limited herein.

S412. The first electronic device 100 determines whether a quantity of the scanning records of the second type corresponding to the physical address carried in the first Bluetooth signals is greater than a first threshold, if yes, the first electronic device 100 performs S413, or if no, the first electronic device 100 returns to perform S406.

It can be understood that a scanning record of the second type is generated each time after the moving state of the first electronic device 100 has changed, and therefore it means that a quantity of the scanning records of the second type is a quantity of times that the moving state of the first electronic device 100 has changed. In this way, the first electronic device 100 can traverse the scanning records of the second type in the second data table. If a quantity of traversed scanning records of the second type is greater than a preset threshold (for example, 2, 4, 6, and 8), it means that the first electronic device 100 is accompanied by the Bluetooth peripheral 300 in more than a preset threshold number (for example, more than or equal to 3) of moving states, which is more in line with a pattern that the first electronic device 100 is tracked by the Bluetooth peripheral 300.

S413. The first electronic device 100 determines whether a distance indicated in a set of location information included in a set of scanning records of the second type is greater than a preset distance threshold, if yes, the first electronic device 100 performs S414, or if no, the first electronic device 100 returns to perform S406.

It can be understood that a longer distance indicated in the set of location information included in the set of scanning records of the second type means that at a longer distance, the first electronic device 100 is accompanied by the Bluetooth peripheral 300. In this way, when the distance indicated in the set of location information included in the set of scanning records of the second type is greater than the preset distance threshold, it is further in line with the pattern that the first electronic device 100 is tracked by the Bluetooth peripheral 300.

Still using the example in which the recorded location information is the base station identifier, how to determine whether the distance indicated in the set of location information included in the set of scanning records of the second type is greater than the preset distance threshold is described.

For example, when a quantity of base station identifiers included in the set of scanning records of the second type is greater than a second preset threshold (for example, 8), it is described whether the distance indicated in the set of location information included in the set of scanning records of the second type is greater than the preset distance threshold.

S414. The first electronic device 100 determines whether a duration indicated in a set of times included in the set of scanning records of the second type is greater than a preset duration threshold, if yes, the first electronic device 100 performs S415, or if no, the first electronic device 100 returns to perform S406.

For example, the first electronic device 100 may subtract the earliest time from the latest time recorded in the set of scanning records of the second type to obtain the duration indicated in the set of times included in the set of scanning records of the second type.

It can be understood that a longer duration indicated in the set of times included in the set of scanning records of the second type means that the first electronic device 100 is accompanied by the Bluetooth peripheral 300 for a longer time. In this way, when the duration indicated in the set of times included in the set of scanning records of the second type is greater than the preset duration threshold, it is further in line with the pattern that the first electronic device 100 is tracked by the Bluetooth peripheral 300. In this way, the first electronic device 100 determines that it is tracked by the Bluetooth peripheral 300. Therefore, in combination of the foregoing 3 conditions, a determination of being tracked by the Bluetooth peripheral 300 is more reliable.

It can be understood that there is no precedence among the foregoing S412, S413, and S414, and S413 and S414 may be omitted.

When S413 and S414 are omitted, how the first electronic device 100 determines that it is tracked is described below with reference to specific application scenarios.

Figure 10:
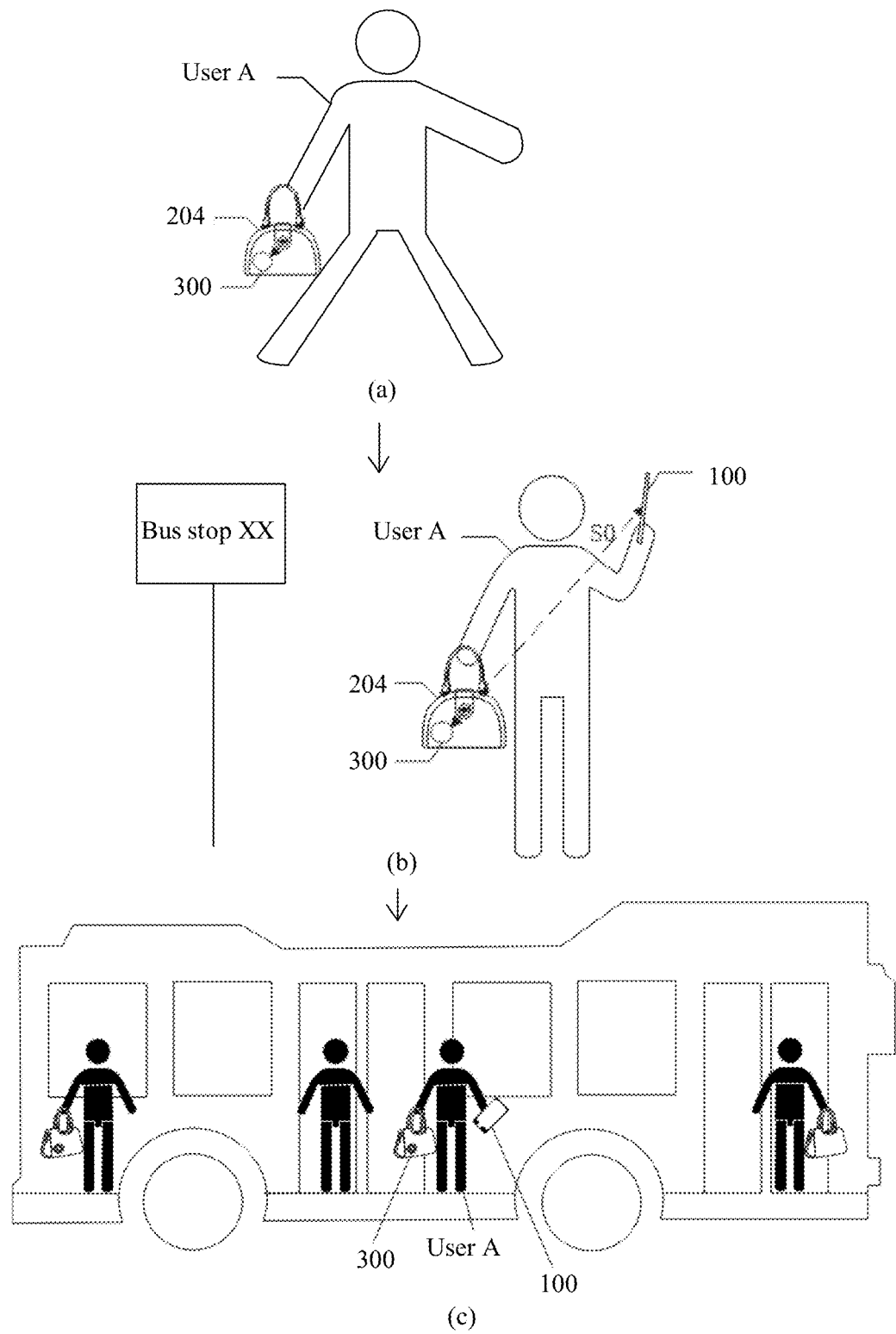
FIG. 10 is a schematic diagram of a scenario in which a Bluetooth peripheral device accompanies a first electronic device of a user in a plurality of moving states according to an embodiment of this application.

As shown in FIG. 10, a user A with a handbag 204 is going to ride a bus. When the user A starts walking toward a bus stop from a starting point, the first electronic device 100 detects that the user A is in a walking state from a stationary state (that is, the moving state changes). At this time, if the first electronic device 100 detects that there is a scanning record of a first type within a previous preset duration, a scanning record of a second type is generated (that is, the first electronic device 100 determines that in the walking state, it is accompanied by the Bluetooth peripheral 300). When the user A arrives at the bus stop on foot, the user A waits for a bus, and at this time, the first electronic device 100 detects that the user A switches from the walking state to the stationary state (that is, the moving state changes). At this time, if the first electronic device 100 detects that there is a scanning record of the first type within a preset duration, another scanning record of the second type is generated (that is, the first electronic device 100 determines that in the stationary state, it is accompanied by the Bluetooth peripheral 300). After the bus arrives at the bust stop and the user A starts riding the bus, the first electronic device 100 detects that the user A switches from the stationary state to a riding state. At this time, if the first electronic device 100 detects that there is a scanning record of the first type within the preset duration, a scanning record of the second type is generated (that is, the first electronic device 100 determines that in the riding state, it is accompanied by the Bluetooth peripheral 300). Then, the first electronic device 100 detects that a quantity of scanning records of the second type is greater than a preset threshold (for example, 2), and the first electronic device 100 determines that it is tracked by the Bluetooth peripheral 300.

Obviously, in the foregoing three states in different times, the first electronic device 100 all determines that it is accompanied by the Bluetooth peripheral 300, that is, the Bluetooth peripheral 300 changes with change of the moving state of the user. This can be interpreted as "things move with people", which is more in line with logical common sense that the first electronic device 100 is tracked by the Bluetooth peripheral 300. In this way, the first electronic device 100 determines that it is tracked by the Bluetooth peripheral 300, with high accuracy. For example, the first electronic device 100 of the user A does not determine that it is tracked by a Bluetooth peripheral 300 carried with the user B on the same bus; or, the first electronic device 100 of the user A does not determine that it is tracked by a Bluetooth peripheral device 300 carried with a user B who is sitting together for coffee, or the like, which is not limited herein.

S415. The first electronic device 100 displays alert information for alerting the user of being tracked by the Bluetooth peripheral 300.

In some embodiments, when the user needs to be alerted, the first electronic device 100 can pop up a first notification at the top of the display. In this case, the user can pull down a message notification bar from the top of the display to view the alert message.

Figure 11:
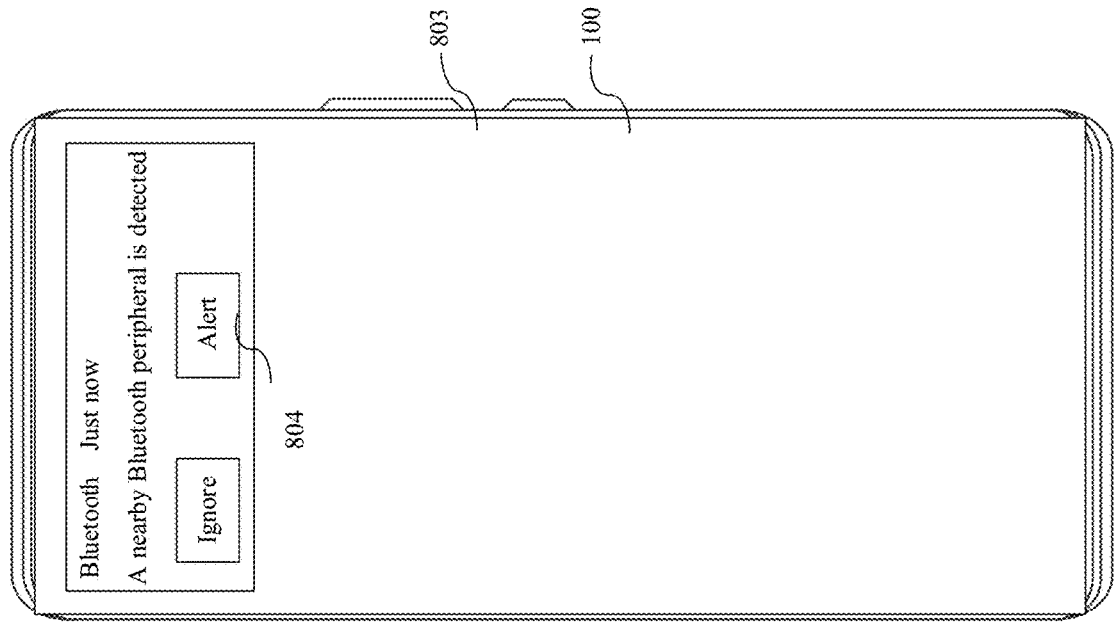
FIG. 11 is a schematic screen diagram of a first electronic device providing an alert of being tracked by a Bluetooth peripheral according to an embodiment of this application.
Figure 11:
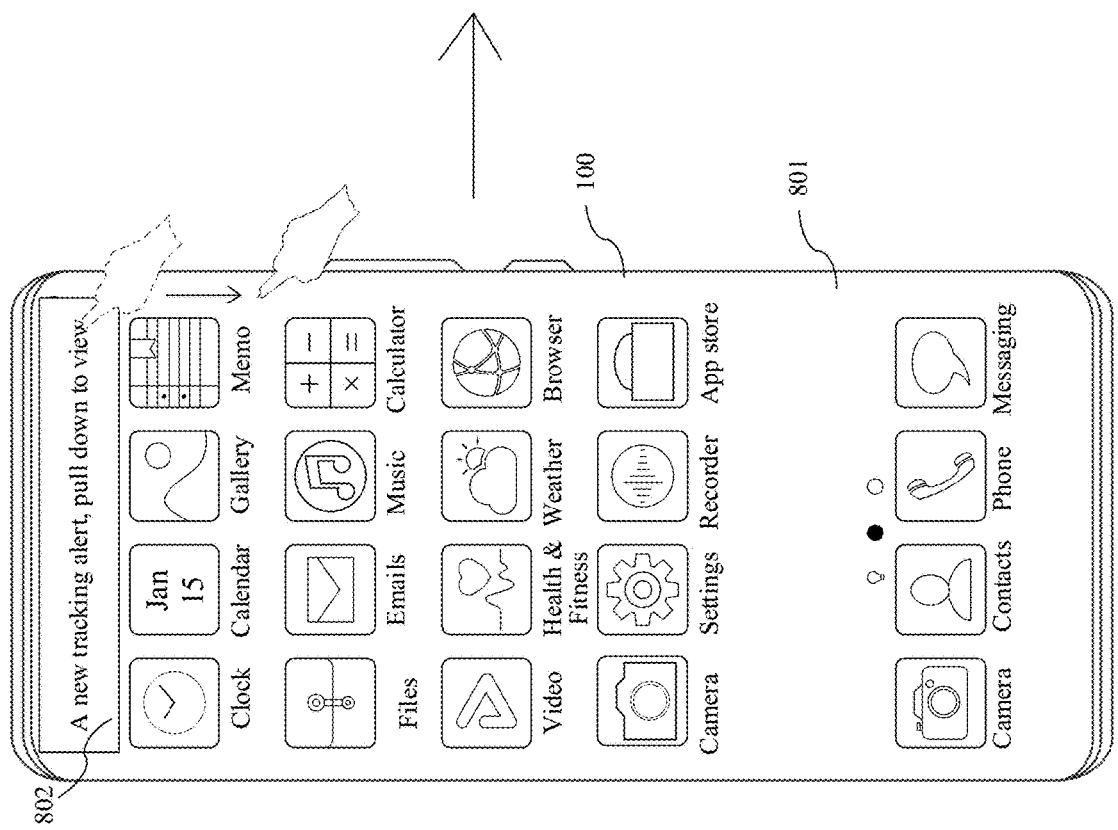

As shown in (a) of FIG. 11, the first electronic device 100 displays an operating system desktop 801. The first electronic device 100 displays a first notification 802 "A new tracking alert, pull down to view" in a navigation bar of the operating system desktop 801. The first electronic device 100 displays a notification bar 803 in response to a pull-down operation by the user on the navigation bar. As shown in (b) of FIG. 11, the notification bar 803 includes content of the alert message "A nearby Bluetooth peripheral is detected". In this way, the user can be alerted that he/she is tracked by the Bluetooth peripheral 300. In this way, the user only needs to perform a pull-down operation on the navigation bar to perceive the alert information, which is convenient and quick.

In addition, the content of the alert information may include: a physical address (for example, which may be a MAC address of the Bluetooth peripheral 300) carried in a latest Bluetooth signal broadcast by the Bluetooth peripheral 300 that is tracking, and a distance (not shown in the figure) between the Bluetooth peripheral 300 that is tracking and the first electronic device 100. The distance between the Bluetooth peripheral 300 that is tracking and the first electronic device 100 can be calculated based on RSSI data of the first Bluetooth signal sent by the Bluetooth peripheral 300.

S416. The first electronic device 100 sends a control command to the Bluetooth peripheral 300 in response to a trigger operation by the user for the alert information.

Figure 12:
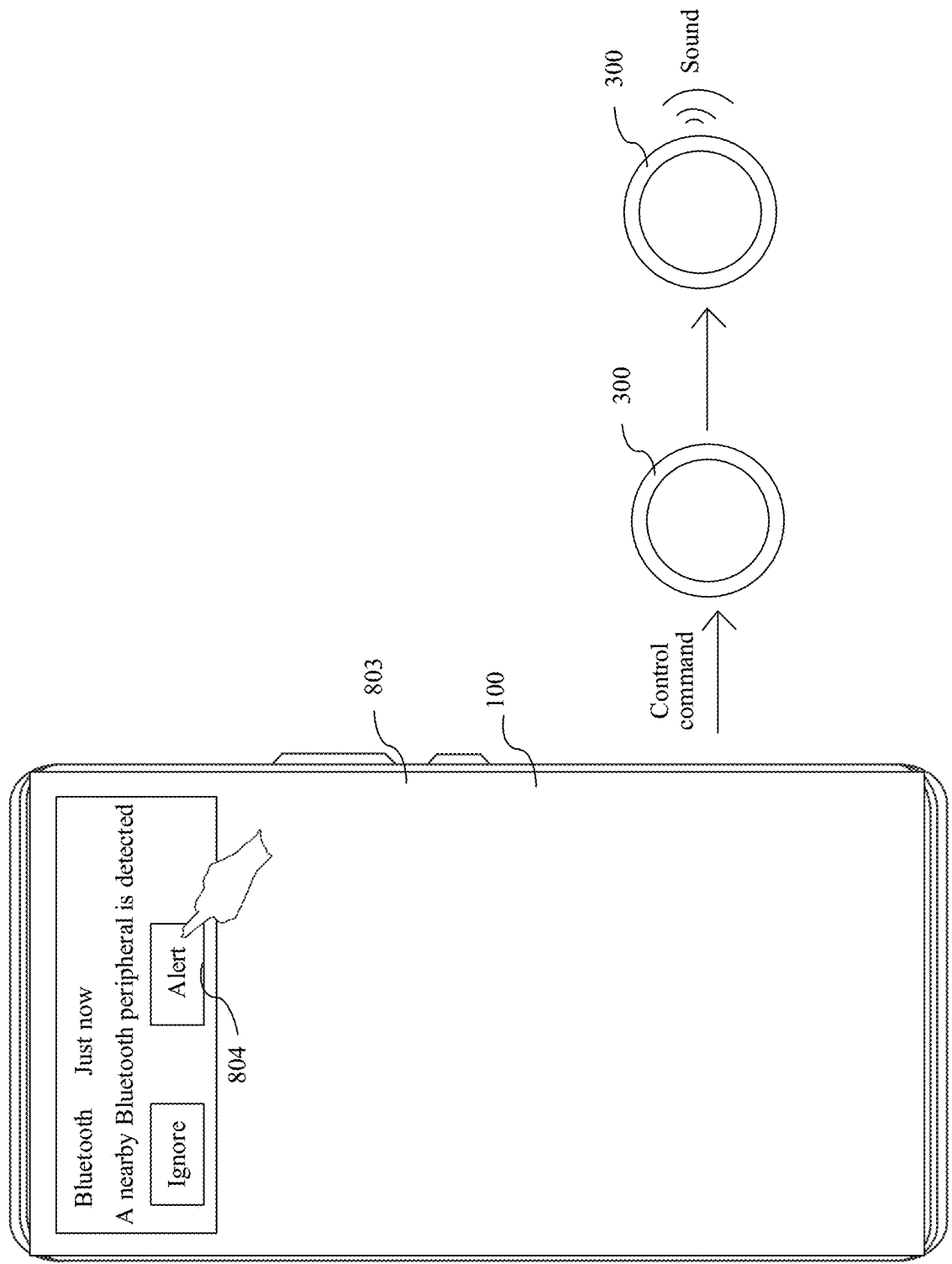
FIG. 12 is a schematic diagram of a first electronic device controlling a Bluetooth peripheral to perform a function of alerting according to an embodiment of this application.

As shown in FIG. 12, the alert information may further include a second control 804, and the second control 804 is used to instruct the Bluetooth peripheral 300 to perform an alerting operation. The first electronic device 100 may further establish a Bluetooth connection with the Bluetooth peripheral 300 in response to a trigger operation by the user on the second control 804. Then, still as shown in FIG. 12, the first electronic device 100 may send a control command to the Bluetooth peripheral 300.

S417. The Bluetooth peripheral 300 performs a function of alerting in response to an alert command.

The Bluetooth peripheral 300 emits sound or vibrates after receiving the control command (that is, performs the function of alerting), to facilitate the user to find the Bluetooth peripheral 300.

The foregoing embodiment describes that the first electronic device 100 performs the function of alerting by using an example in which the first electronic device 100 displays alert information. In some other embodiments, the first electronic device 100 may alternatively perform the function of alerting in, but not limited to, the following two implementations:

First implementation: When the first electronic device 100 detects that it is tracked by the Bluetooth peripheral 300, if the first electronic device 100 is in a dormant state (that is, the user does not use the first electronic device 100), the first electronic device 100 can output alert information through one or more components of the first electronic device 100. For example, the first electronic device 100 triggers a motor of the first electronic device 100 to start vibrating, or outputs an alert tone through a speaker of the first electronic device 100, or controls one or more light indicators of the first electronic device 100 to blink. The alert tone output by the speaker may be a preset ring tone, or may be an alert voice synthesized by the first electronic device 100.

Figure 13:
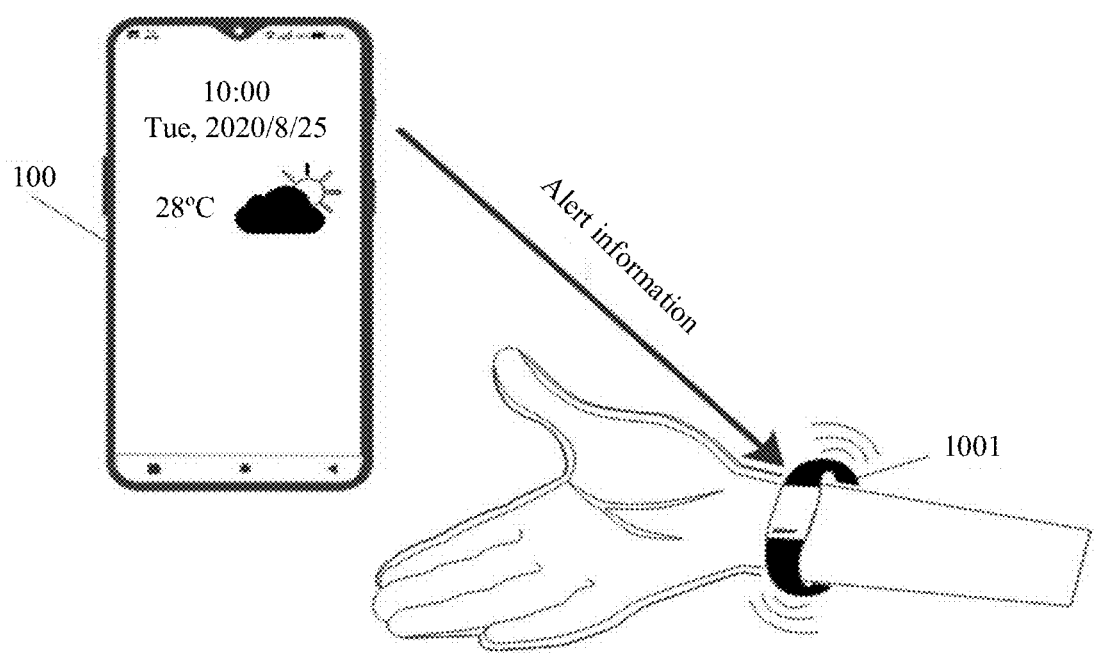
FIG. 13 is a schematic diagram of a first electronic device controlling a wearable device to perform a function of alerting according to an embodiment of this application.

Second implementation: When the user wears one or more wearable devices which have established communication connections with the first electronic device 100, the first electronic device 100 can send alert information to these wearable devices that are communicatively connected, to trigger the wearable devices to perform corresponding actions to alert the user. For example, as shown in FIG. 13, when the first electronic device 100 is in communication connection with a bracelet 1001 (that is, a wearable device) worn by the user on a wrist, the first electronic device 100 sends alert information to the bracelet 1001, and then the bracelet 1001 starts to vibrate and output an alert tone in response to the alert information.

In addition, when meeting a preset condition, the first electronic device 100 stops receiving the first Bluetooth signal. For example, when in power off, the first electronic device 100 stops receiving the first Bluetooth signal. For another example, the first electronic device 100 may alternatively disable the preset mode in response to a disabling operation by the user on the first control 604 in FIG. 9. In this way, the first electronic device 100 stops receiving the first Bluetooth signal.

Figure 14A:
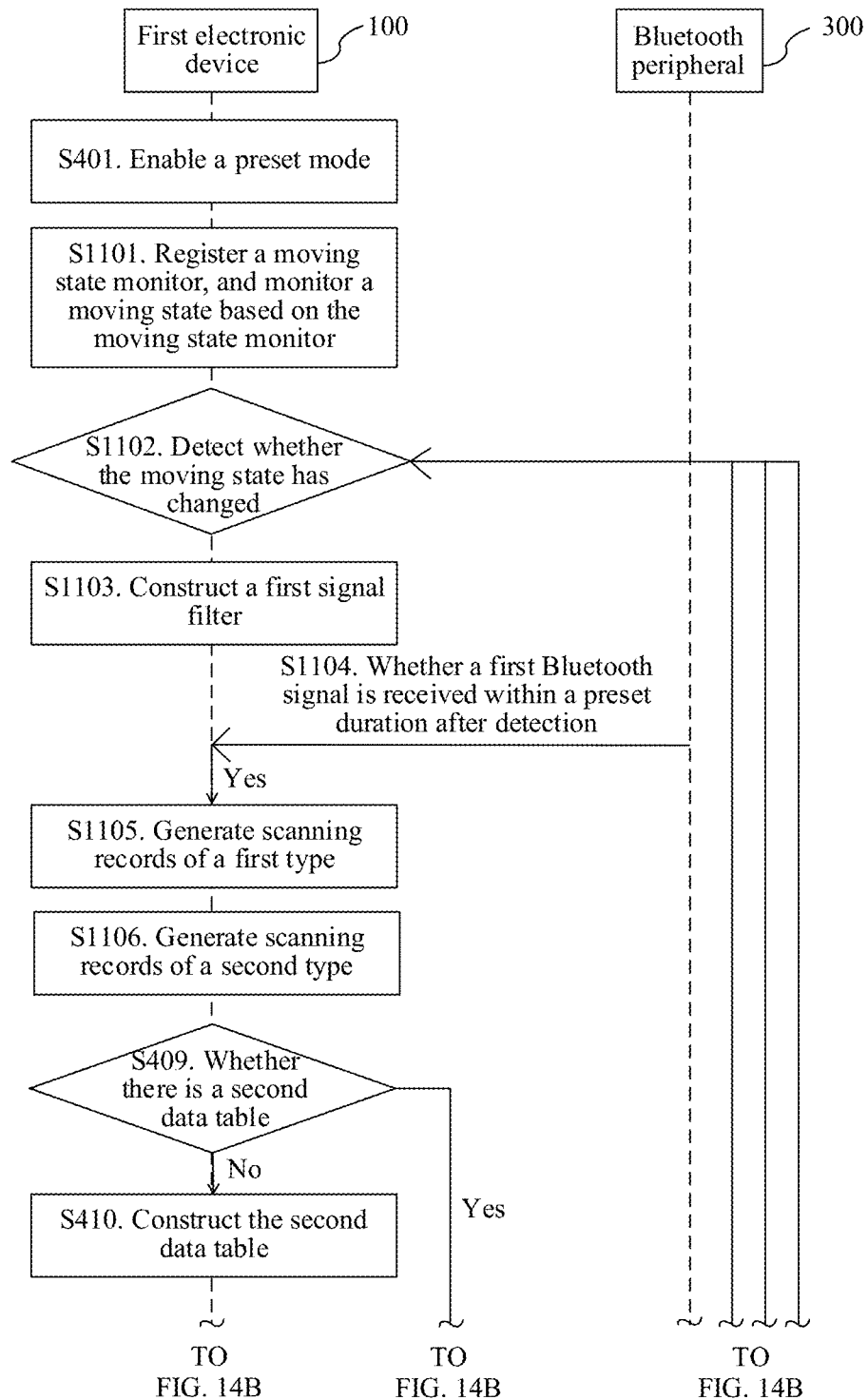
FIG. 14A and FIG. 14B are a second flowchart of a device tracking detection method according to an embodiment of this application.
Figure 14B:
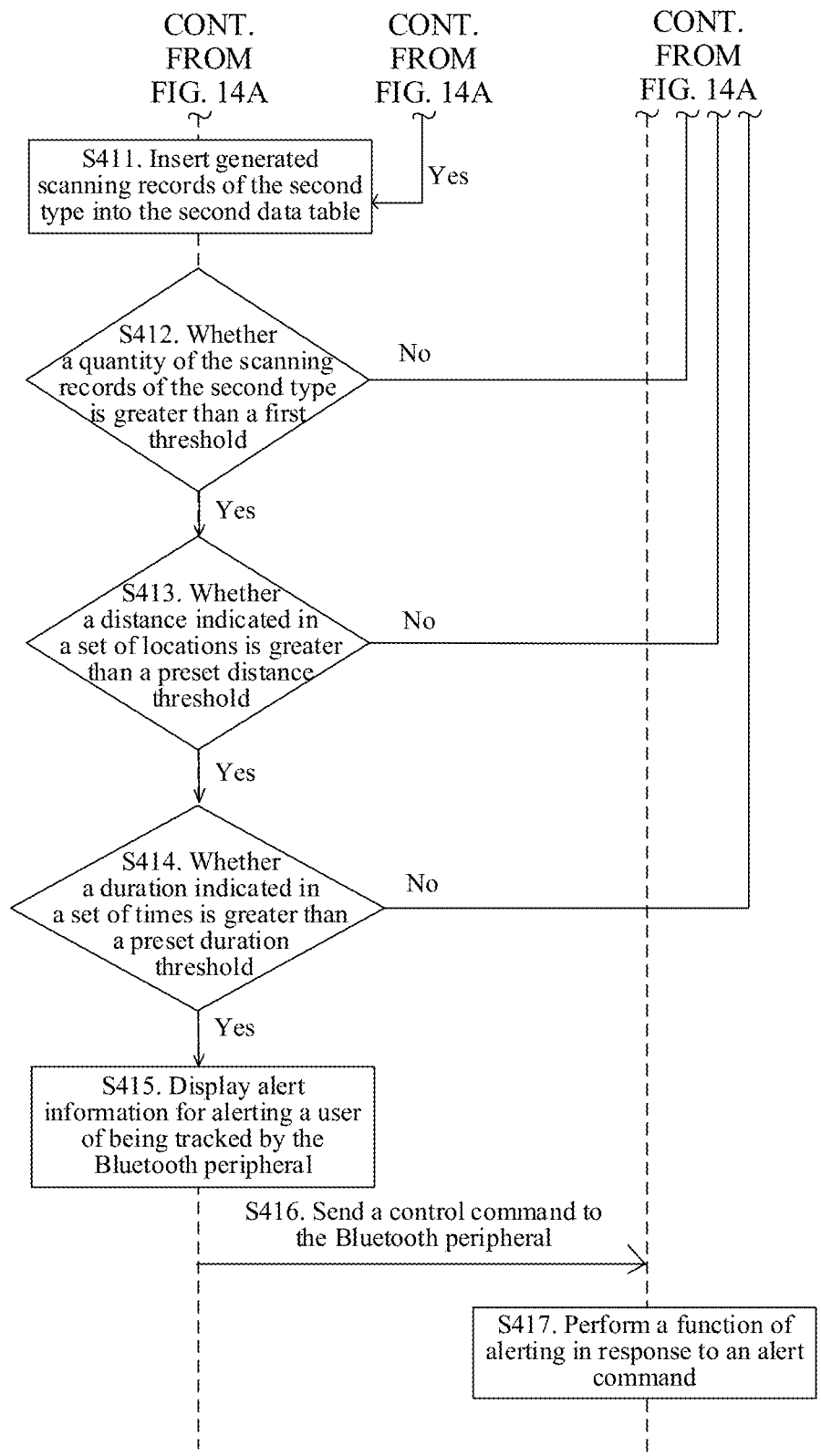

In addition, it can be learned from S402 to S408 in the foregoing embodiment that the foregoing embodiment is described by using an example in which the first electronic device 100 continuously receives the first Bluetooth signals broadcast by the Bluetooth peripheral 300. In some other embodiments, as shown in FIG. 14A, the foregoing S402 to S408 may alternatively be replaced by:

S1101. The first electronic device 100 registers a moving state monitor and monitors a moving state based on the moving state monitor.

S1102. The first electronic device 100 detects whether the moving state has changed, if yes, the first electronic device 100 performs S1103, or if no, the first electronic device 100 returns to perform S1101.

The process of detecting the moving state in S1101 is the same as the process of detecting the moving state in the foregoing S406, and details are not described herein again.

S1103. The first electronic device 100 constructs a first signal filter.

The process of constructing the first signal filter in S1103 is also the same as the process of constructing the first signal filter in S402, and details are not described herein again. In addition, S1003 may be omitted.

S1104. The first electronic device 100 determines whether a first Bluetooth signal is received within a preset duration after detection by the first signal filter; and if yes, the first electronic device 100 performs S1105.

For example, the first electronic device 100 may set a timer with a preset duration. Then, the first electronic device 100 starts the timer after completion of constructing the first signal filter, and receives the first Bluetooth signal based on the first signal filter. The first electronic device 100 completes timing after the preset duration and stops receiving the first Bluetooth signal. Obviously, the first electronic device 100 only receives, during timing of the timer, the first Bluetooth signal broadcast by the Bluetooth peripheral 300, which can save power consumption.

Generally, an interval at which the Bluetooth peripheral 300 broadcasts the first Bluetooth signal is 6 seconds. To enable at least one first Bluetooth signal to be received within the preset duration, the preset duration may be set to 18 seconds.

S1105. The first electronic device 100 generates scanning records of a first type, where there is a correspondence between the scanning records of the first type and the physical address carried in the first Bluetooth signal.

A principle of S1105 is the same as a principle of the foregoing S405, and details are not described herein again.

S1106. The first electronic device 100 generates scanning records of a second type, where there is a correspondence between the scanning records of the second type and the physical address carried in the first Bluetooth signal.

A principle of generating the scanning records of the second type in S1106 is the same as that of generating the scanning records of the second type in the foregoing S408, and details are not described herein again.

In addition, before S402 in the foregoing embodiment, the device tracking detection method may further include:

constructing, by the first electronic device 100, a second signal filter. The second signal filter may be constructed as follows: The first electronic device obtains service data and corresponding manufacturer data (manufacturer ID) of a Bluetooth signal, and then inputs the service data and manufacturer data of the Bluetooth signal as input parameters into a filter constructor, so that the second signal filter constructed by the filter constructor can be obtained. The second signal filter may be a nearby filter.

Then, the first electronic device 100 determines whether a second Bluetooth signal broadcast by a second electronic device can be received based on the second signal filter, and if yes, the first electronic device 100 performs S402.

It can be learned from the described working principle of the Bluetooth peripheral 300 that, only when the first electronic device 100 can receive, based on the second signal filter, a second Bluetooth signal broadcast by a second electronic device nearby, location information of the first electronic device 100 (that is, a location of the user) may be leaked to others. In this way, subsequent steps may be performed only when the second Bluetooth signal broadcast by the second electronic device is received, which can save power consumption of the first electronic device 100.

In addition, the foregoing embodiment is described by using an example in which the location information of the Bluetooth peripheral 300 is base station identifier(s). In some other embodiments, the location information of the Bluetooth peripheral 300 may alternatively be wireless network identifier(s), geographical coordinate(s), or the like, which is not limited herein.

A wireless network identifier may be obtained by the following manner: searching, by the first electronic device 100, a wireless local area network (Wifi) and recording a network identifier (Wifi ID) of a searched wireless local area network, and determining the searched network identifier as location information of the first electronic device 100. If a plurality of wireless local area networks are detected, the first electronic device 100 may select a network identifier with the strongest signal strength as the location information of the first electronic device 100. For example, the first electronic device 100 may call the wireless communications module shown in FIG. 5 to search a wireless local area network.

Alternatively, the first electronic device 100 reads a network identifier of a wireless local area network currently accessed by the first electronic device 100, and determines the read network identifier as location information of the first electronic device 100. For example, the first electronic device 100 may call the wireless communications module shown in FIG. 5 to read the network identifier of the wireless local area network currently accessed by the first electronic device 100.

In addition, a geographical coordinate may be obtained by the following manner: collecting, by the first electronic device 100 through a GPS positioning module, a geographical coordinate, and using the geographical coordinate collected by the first electronic device 100 as location information of the first electronic device 100.

According to a second aspect, this application further provides a device tracking detection method, applied to a first electronic device, where the method includes: receiving, by the first electronic device, a Bluetooth signal through a first signal filter when it is detected that a moving state has changed, where the first signal filter is configured to receive the first Bluetooth signal; storing, by the first electronic device, scanning records of a second type when the first electronic device detects the first Bluetooth signal, where there is a correspondence between the scanning records of the second type and a physical address carried in the first Bluetooth signal; and outputting, by the first electronic device, alert information for alerting a user of being tracked by a Bluetooth peripheral when a quantity of scanning records of the second type corresponding to the physical address is greater than a first threshold.

In an optional implementation, the receiving, by the first electronic device, a Bluetooth signal through a first signal filter when it is detected that a moving state has changed includes: enabling, by the first electronic device, a timer upon detecting that the moving state has changed; receiving, by the first electronic device, the Bluetooth signal through the first signal filter; and stopping receiving, by the first electronic device, the Bluetooth signal upon expiration of the timer, where a timing duration of the timer is greater than a period during which the Bluetooth peripheral broadcasts the first Bluetooth signal.

Figure 15:
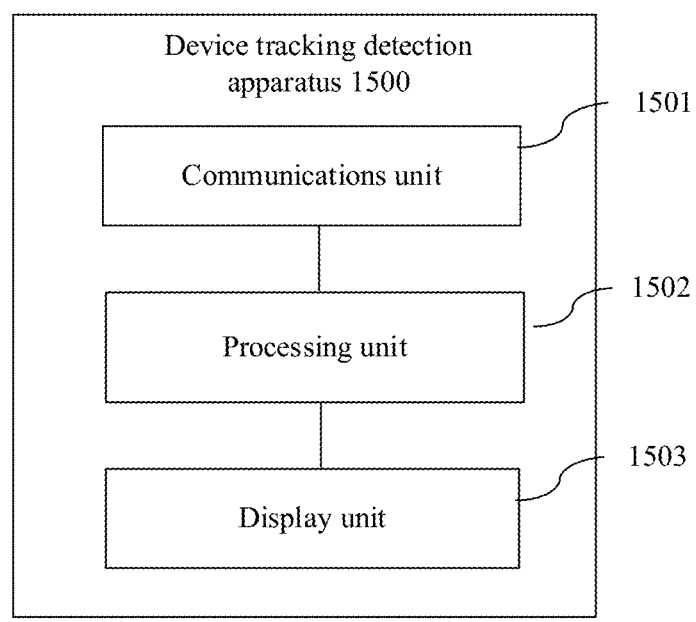
FIG. 15 is a schematic diagram of functional modules of a device tracking detection apparatus according to an embodiment of this application.

With reference to FIG. 15, an embodiment of this application further provides a device tracking detection apparatus 1500, applied to a first electronic device. The apparatus 1500 includes: a communications unit 1501, configured to receive a Bluetooth signal through a first signal filter, where the first signal filter is configured to receive a first Bluetooth signal; and a processing unit 1502, configured to store scanning records of a first type when the first Bluetooth signal is detected, where there is a correspondence between the scanning records of the first type and a physical address carried in the first Bluetooth signal. The processing unit 1502 is further configured to store scanning records of a second type when the first electronic device detects that a moving state has changed and there are the scanning records of the first type within a previous preset duration, where there is a correspondence between the scanning records of the second type and the physical address carried in the first Bluetooth signal. The processing unit 1502 is further configured to output alert information for alerting a user of being tracked by a Bluetooth peripheral when a quantity of scanning records of the second type corresponding to the physical address is greater than a first threshold.

In an optional implementation, the processor is further configured for the first electronic device to enable a preset mode, where in the preset mode, a communications module is capable of receiving the first Bluetooth signal based on the first signal filter.

Further, the device tracking detection apparatus 1500 further includes a display unit 1503 configured to display a first screen, where the first screen includes a first control. The processing unit 1502 is specifically configured to enable the preset mode in response to a trigger operation by the user on the first control.

Still further, the display unit 1503 is specifically configured for the first electronic device to display a system desktop in response to the trigger operation by the user, where the system desktop includes a first prompt box, and the first prompt box includes the first control. The processing unit 1502 is specifically configured to enable the preset mode in response to an enabling operation by the user on the first control.

Alternatively, still further, the display unit 1503 is specifically configured to: display a system desktop, where the system desktop includes a "settings" icon; and display the first screen in response to a trigger operation by the user on the "settings" icon, where the first screen includes the first control. The processing unit 1502 is specifically configured to enable the preset mode in response to an enabling operation by the user on the first control.

In an optional implementation, the processing unit 1502 is specifically configured for the first electronic device to generate scanning records of the first type when the first Bluetooth signal is detected; and insert the scanning records of the first type into a preset first data table, where in the first data table, there is a correspondence between the scanning records of the first type and the physical address carried in the first Bluetooth signal.

In an optional implementation, the processing unit 1502 is specifically configured to: generate scanning records of a second type when the first electronic device detects that a moving state has changed and there are the scanning records of the first type within a previous preset duration; and insert the scanning records of the second type into a preset second data table, where in the second data table, there is a correspondence between the scanning records of the second type and the physical address carried in the first Bluetooth signal.

Further, the scanning records of the first type include location information and times when the first Bluetooth signals are received, and the scanning records of the second type include location information and times in the scanning records of the first type present within the previous preset duration.

Still further, the processing unit 1502 is specifically configured to: identify whether a distance indicated in a set of location information included in the second data table is greater than a preset distance threshold; when the distance is greater than the preset distance threshold, identify whether a duration indicated in a set of times included in the second data table is greater than a preset duration threshold; when the duration is greater than the preset duration threshold, identify whether the quantity of scanning records of the second type in the second data table is greater than the first threshold; and when the quantity is greater than the first threshold, output alert information for alerting the user of being tracked by the Bluetooth peripheral.

In a possible implementation, the display unit 1503 is specifically configured to pop up a first notification in a navigation bar of a second screen that is being displayed. The display unit 1503 is further configured to display the alert information in response to a pull-down operation by the user on the navigation bar.

Further, the communications unit 1501 is further configured to establish a Bluetooth connection with the Bluetooth peripheral based on the physical address carried in the first Bluetooth signal in response to a trigger operation by the user on a second control. The processing unit 1502 is further configured to control the Bluetooth peripheral to perform a function of alerting.

Further, the processing unit 1502 is further configured to control a motor of the first electronic device to vibrate; or the processing unit 1502 is further configured to control a speaker of the first electronic device to output an alert tone; or the processing unit 1502 is further configured to control a light indicator of the first electronic device to blink; or when the alert information is a control command, the processing unit 1502 is further configured to send a control command to a wearable device with which a communication connection has been established, to control the wearable device to vibrate or output an alert tone.

In an optional implementation, the processing unit 1502 is specifically configured for the first electronic device to: detect whether the moving state has changed; and detecting whether there is a scanning record of the first type within the previous preset duration when the moving state has changed; and if yes, store the scanning records of the second type.

Further, the processing unit 1502 is configured to obtain target information, where the target information is information indicating the moving state of the first electronic device; and configured for the first electronic device to detect, based on the target information, whether the moving state has changed.

Still further, when the target information is moving speed, the processing unit 1502 is specifically configured to: obtain, based on a moving state monitor, a moving speed of the first electronic device, and when a speed range of the moving speed has changed, determine that the moving state has changed. Alternatively, when the target information is posture parameter, the processing unit 1502 is specifically configured to monitor, based on the moving state monitor, the posture parameter, and configured for the first electronic device to: input the posture parameter into a moving state identification model so that the moving state identification model outputs the moving state based on the posture parameter; and when the moving states of two adjacent outputs are different, determine that the moving state has changed. Alternatively, when the target information is itinerary information recorded in an application program, the processing unit 1502 is specifically configured to: obtain the itinerary information recorded in the application program, where the itinerary information indicates that the first electronic device is in a target moving state during a target period; and when it is determined that the target period is reached, determine that the moving state of the first electronic device has changed.

In some other implementations, still with reference to FIG. 15, an embodiment of this application provides a device tracking detection apparatus 1500, applied to a first electronic device. The apparatus 1500 includes: a communications unit 1501, configured to receive a Bluetooth signal through a first signal filter when it is detected that a moving state has changed, where the first signal filter is configured to receive a first Bluetooth signal; and a processing unit 1502, configured to store scanning records of a second type when the first Bluetooth signal is detected, where there is a correspondence between the scanning records of the second type and the physical address carried in the first Bluetooth signal. The processing unit 1502 is further configured to output alert information for alerting a user of being tracked by a Bluetooth peripheral when a quantity of scanning records of the second type corresponding to the physical address is greater than a first threshold.

In an optional implementation, the processing unit 1502 is configured to enable a timer upon detecting that the moving state has changed. The communications unit 1501 is specifically configured to start receiving the Bluetooth signal through the first signal filter and stop receiving the Bluetooth signal upon expiration of the timer, where a timing duration of the timer is greater than a period during which the Bluetooth peripheral broadcasts the first Bluetooth signal.

Figure 16:
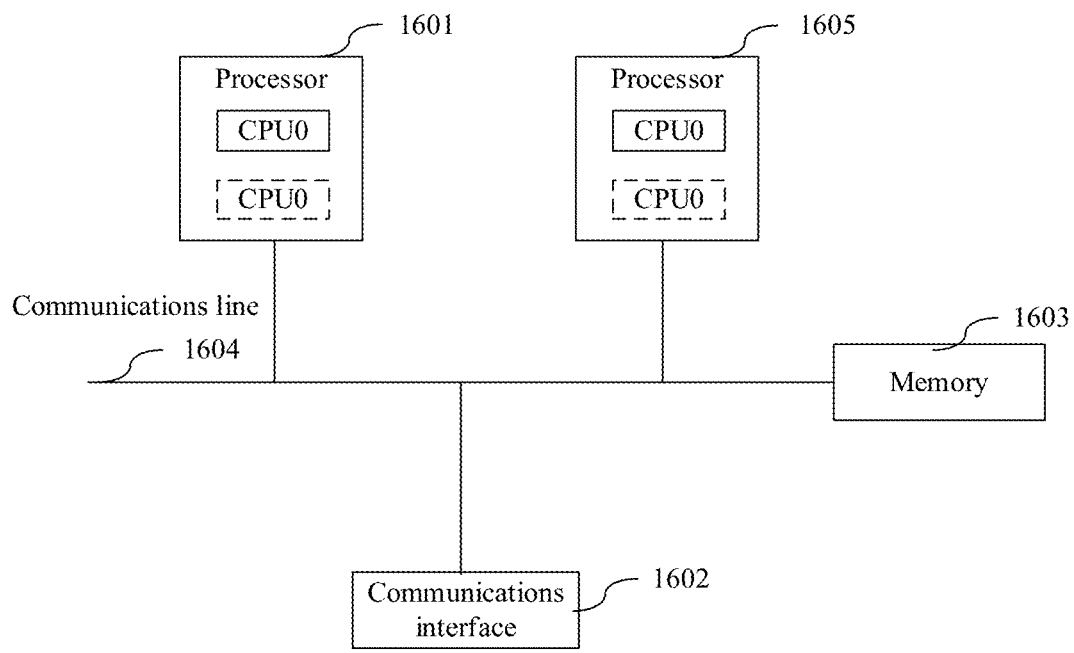
FIG. 16 is a schematic diagram of a hardware structure of an electronic device according to an embodiment of this application.

For example, FIG. 16 is a schematic diagram of a hardware structure of an electronic device according to an embodiment of this application. As shown in FIG. 16, the electronic device includes a processor 1601, a communications line 1604, and at least one communications interface (in FIG. 16, the communications interface 1602 is used as an example for description).

The processor 1601 may be a general-purpose central processing unit (central processing unit, CPU), a micro central processing unit, an application-specific integrated circuit (application-specific integrated circuit, ASIC), or one or more integrated circuits configured to control program execution of the solutions in this application.

The communications line 1604 may include a circuit for transmitting information between the foregoing components.

The communications interface 1602 is an apparatus using any transceiver or the like, and is configured to communicate with another device or a communications network, such as, an Ethernet or a wireless local area network (wireless local area network, WLAN).

Optionally, the electronic device may further include a memory 1603.

The memory 1603 may be a read-only memory (read-only memory, ROM) or another type of static storage device capable of storing static information and an instruction, a random access memory (random access memory, RAM) or another type of dynamic storage device capable of storing information and an instruction, an electrically erasable programmable read-only memory (electrically erasable programmable read-only memory, EEPROM), a compact disc read-only memory (compact disc read-only memory, CD-ROM) or another compact disc storage, an optical disc storage (including a compressed optical disc, a laser disc, an optical disc, a digital versatile disc, a blue-ray optical disc, and the like), a magnetic disk storage medium or another magnetic storage device, or any other medium capable of carrying or storing expected program code in a form of an instruction or a first data structure and capable of being stored and accessed by a computer. However, the memory is not limited thereto. The memory may exist independently and is connected to the central processing unit through the communications line 1604. Alternatively, the memory may be integrated with the central processing unit.

The memory 1602 is configured to store computer-executable instructions for performing the solutions in this application, and execution of the computer-executable instructions is controlled by the processor 1601. The processor 1601 is configured to execute the computer-executable instructions stored in the memory 1603, to implement the device tracking detection method provided in the embodiments of this application.

Possibly, the computer-executable instructions in this embodiment of this application may also be referred to as application program code. This is not specifically limited in this embodiment of this application.

In a specific implementation, in an embodiment, the processor 1601 may include one or more CPUs, for example, a CPU 0 and a CPU 1 in FIG. 16.

In a specific implementation, in an embodiment, the electronic device may include a plurality of central processing units, such as the processor 1601 and a processor 1605 in FIG. 16. Each of the central processing units may be a single-core (single-CPU) central processing unit, or may be a multi-core (multi-CPU) central processing unit. The central processing unit herein may be one or more devices, circuits, and/or processing cores configured to process data (for example, a computer program instruction).

Figure 17:
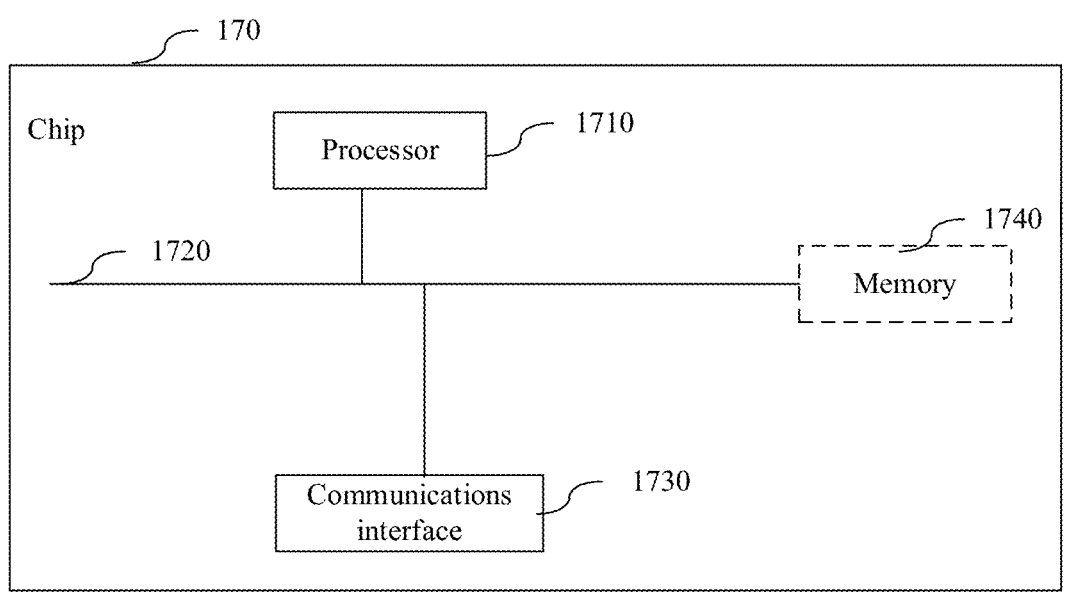
FIG. 17 is a schematic structural diagram of a chip according to an embodiment of this application.

For example, FIG. 17 is a schematic structural diagram of a chip according to an embodiment of this application. The chip 170 includes one or more (including two) processors 1710 and communications interfaces 1730.

In some implementations, a memory 1740 stores the following elements: an executable module or a first data structure, or a subset thereof, or an extended set thereof.

In this embodiment of this application, the memory 1740 may include a read-only memory and a random access memory, and provides instructions and data to the processor 1710. A part of the memory 1740 may further include a non-volatile random access memory (non-volatile random access memory, NVRAM).

In this embodiment of this application, the memory 1740, the communications interface 1730, and the memory 1740 are coupled by using a bus system 1720. The bus system 1720 may further include a power bus, a control bus, a status signal bus, and the like, in addition to a data bus. For ease of description, various buses are marked as the bus system 1720 in FIG. 17.

The method described in the foregoing embodiments of this application may be applied to the processor 1710 or implemented by the processor 1710. The processor 1710 may be an integrated circuit chip with a signal processing capability. During implementation, the steps of the foregoing method may be implemented by hardware integrated logic circuits in the processor 1710 or instructions in the form of software. The foregoing processor 1710 may be a general-purpose central processing unit (for example, a micro central processing unit or a conventional central processing unit), a digital signal central processing unit (digital signal processing, DSP), an application-specific integrated circuit (application specific integrated circuit, ASIC), a field-programmable gate array (field-programmable gate array, FPGA) or another programmable logic device, a discrete gate, a transistor logic device, or a discrete hardware component. The processor 1710 may implement or execute the methods, steps, and logical block diagrams disclosed in the embodiments of this application.

The steps of the methods disclosed with reference to the embodiments of this application may be directly implemented by a hardware decoding central processing unit, or may be implemented by a combination of hardware and software modules in a decoding central processing unit. The software module may be located in a storage medium mature in the art, such as a random access memory, a read-only memory, a programmable read-only memory, or an electrically erasable programmable read only memory (electrically erasable programmable read only memory, EEPROM). The storage medium is located in the memory 1740, and the processor 1710 fetches information in the memory 1740, and completes the steps of the foregoing method in combination with its hardware.

In the foregoing embodiment, the instruction stored by the memory and executed by the central processing unit may be implemented in a form of a computer program product. The computer program product may be written into the memory in advance, or may be downloaded to and installed in the memory in a form of software.

The computer program product includes one or more computer instructions. When computer program instructions are loaded and executed on a computer, the processes or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL)) or wireless (for example, infrared, radio, or microwave) manner. The computer-readable storage medium may be any usable medium accessible by a computer, or a data storage device, such as a server or a data center, integrating one or more usable media. For example, the usable medium may include a magnetic medium (for example, a floppy disk, a hard disk, or a magnetic tape), an optical medium (for example, a digital versatile disc (digital versatile disc, DVD)), a semiconductor medium (for example, a solid state drive (solid state disk, SSD)), or the like.

An embodiment of this application further provides a computer-readable storage medium. The methods described in the foregoing embodiments may be all or partially implemented by using software, hardware, firmware, or any combination thereof. The computer-readable medium may include a computer storage medium and a communications medium, and may further include any medium that may enable a computer program to be transmitted from one place to another place. The storage medium may be any target medium accessible by a computer.

As a possible design, the computer-readable medium may include a compact disc read-only memory (compact disc read-only memory, CD-ROM), a RAM, a ROM, an EEPROM or another disc storage. The computer-readable medium may include magnetic disk storage or other magnetic disk storage devices. Any connecting line may also be properly termed a computer-readable medium. For example, if software is transmitted from a website, a server, or another remote source by using a coaxial cable, an optical cable, a twisted pair, a DSL, or a wireless technology (such as infrared, radio, or microwave), then the coaxial cable, the optical cable, the twisted pair, the DSL, or the wireless technology such as infrared, radio, or microwave is included in the definition of medium. Disk and disc, as used herein, include compact disc (CD), laser disc, optical disc, digital versatile disc (digital versatile disc, DVD), floppy disk, and Blu-ray disc, where disks usually reproduce data magnetically, while discs reproduce data optically with lasers.

Combination of the foregoing should also be included in the protection scope of the computer-readable medium. The foregoing descriptions are merely specific implementations of this application, but are not intended to limit the protection scope of this application. Any variations or replacements apparent to those skilled in the art within the technical scope disclosed by this application shall fall within the protection scope of this application. Therefore, the scope of protection of this application shall be subject to the scope of protection of the claims.

What is claimed is:

1. A method, comprising:
receiving, by a first electronic device, a first Bluetooth signal through a first signal filter when it is detected that a moving state has changed, wherein the first signal filter is configured to receive the first Bluetooth signal, and wherein the receiving, by the first electronic device, the first Bluetooth signal through the first signal filter when it is detected that the moving state has changed comprises:
  enabling, by the first electronic device, a timer upon detecting that the moving state has changed;
  receiving, by the first electronic device, the first Bluetooth signal through the first signal filter; and
  stopping receiving, by the first electronic device, the first Bluetooth signal upon expiration of the timer, wherein a timing duration of the timer is greater than a period during which a Bluetooth peripheral broadcasts the first Bluetooth signal;
storing, by the first electronic device, scanning records of a second type when the first electronic device detects the first Bluetooth signal, wherein there is a correspondence between the scanning records of the second type and a physical address carried in the first Bluetooth signal; and outputting, by the first electronic device, alert information for alerting a user of being tracked by the Bluetooth peripheral when a quantity of the scanning records of the second type corresponding to the physical address is greater than a first threshold.

2. The method according to claim 1, further comprising:
before the receiving, by the first electronic device, the first Bluetooth signal through the first signal filter, enabling, by the first electronic device, a preset mode, wherein in the preset mode, the first electronic device is capable of receiving the first Bluetooth signal based on the first signal filter.

3. The method according to claim 2, wherein the enabling, by the first electronic device, the preset mode comprises:
displaying, by the first electronic device, a first screen, wherein the first screen comprises a first control; and
enabling, by the first electronic device, the preset mode in response to a trigger operation by the user on the first control.

4. The method according to claim 3, wherein the first screen is a system desktop, and the displaying, by the first electronic device, the first screen comprises:
displaying, by the first electronic device, the system desktop in response to the trigger operation by the user, wherein the system desktop comprises a first prompt box, and the first prompt box comprises the first control; and
enabling, by the first electronic device, the preset mode in response to an enabling operation by the user on the first control.

5. The method according to claim 1, wherein the storing, by the first electronic device, the scanning records of the second type comprises:
inserting, by the first electronic device, the scanning records of the second type into a preset second data table, wherein in the preset second data table, there is the correspondence between the scanning records of the second type and the physical address carried in the first Bluetooth signal.

6. The method according to claim 5, wherein the outputting, by the first electronic device, the alert information for alerting the user of being tracked by the Bluetooth peripheral when the quantity of the scanning records of the second type corresponding to the physical address is greater than the first threshold comprises:
identifying whether a distance indicated in a set of location information in the preset second data table is greater than a preset distance threshold;
when the distance is greater than the preset distance threshold, identifying whether a duration indicated in a set of times comprised in the preset second data table is greater than a preset duration threshold;
when the duration is greater than the preset duration threshold, identifying whether the quantity of the scanning records of the second type in the preset second data table is greater than the first threshold; and
when the quantity is greater than the first threshold, outputting, by the first electronic device, the alert information for alerting the user of being tracked by the Bluetooth peripheral.

7. The method according to claim 1, wherein the outputting, by the first electronic device, the alert information for alerting the user of being tracked by the Bluetooth peripheral comprises:

popping up, by the first electronic device, a first notification in a navigation bar of a second screen that is being displayed; and
displaying, by the first electronic device, the alert information in response to a pull-down operation by the user on the navigation bar.

8. The method according to claim 7, wherein the alert information further comprises a second control, and the method further comprises:
after the displaying the alert information:
establishing, by the first electronic device, a Bluetooth connection with the Bluetooth peripheral based on the physical address carried in the first Bluetooth signal in response to a trigger operation by the user on the second control; and
controlling, by the first electronic device, the Bluetooth peripheral to perform a function of alerting.

9. The method according to claim 1, wherein the outputting, by the first electronic device, the alert information for alerting the user of being tracked by the Bluetooth peripheral comprises:
controlling, by the first electronic device, a motor of the first electronic device to vibrate; or
controlling, by the first electronic device, a speaker of the first electronic device to output an alert tone; or
controlling, by the first electronic device, a light indicator of the first electronic device to blink; or
when the alert information is a control command, sending, by the first electronic device, the control command to a wearable device with which a communication connection has been established, to control the wearable device to vibrate or output the alert tone.

10. An electronic device, comprising a memory, at least one central processing unit, and a computer program stored in the memory and capable of running on the at least one central processing unit, wherein when the computer program is executed by the at least one central processing unit, the electronic device is caused to perform:
receiving a first Bluetooth signal through a first signal filter when it is detected that a moving state has changed, wherein the first signal filter is configured to receive the first Bluetooth signal;
storing scanning records of a second type when the electronic device detects the first Bluetooth signal, wherein there is a correspondence between the scanning records of the second type and a physical address carried in the first Bluetooth signal, and wherein the storing the scanning records of the second type comprises:
inserting the scanning records of the second type into a preset second data table, wherein in the preset second data table, there is the correspondence between the scanning records of the second type and the physical address carried in the first Bluetooth signal; and
outputting alert information for alerting a user of being tracked by a Bluetooth peripheral when a quantity of the scanning records of the second type corresponding to the physical address is greater than a first threshold, wherein the outputting the alert information for alerting the user of being tracked by the Bluetooth peripheral when the quantity of the scanning records of the second type corresponding to the physical address is greater than the first threshold comprises:
identifying whether a distance indicated in a set of location information in the preset second data table is greater than a preset distance threshold;

when the distance is greater than the preset distance threshold, identifying whether a duration indicated in a set of times comprised in the preset second data table is greater than a preset duration threshold;

when the duration is greater than the preset duration threshold, identifying whether the quantity of the scanning records of the second type in the preset second data table is greater than the first threshold; and when the quantity is greater than the first threshold, outputting the alert information for alerting the user of being tracked by the Bluetooth peripheral.

11. The electronic device according to claim 10, the electronic device is further caused to perform:

before the receiving the first Bluetooth signal through the first signal filter, enabling a preset mode, wherein in the preset mode, the electronic device is capable of receiving the first Bluetooth signal based on the first signal filter.

12. The electronic device according to claim 11, wherein the enabling the preset mode comprises:

displaying a first screen, wherein the first screen comprises a first control; and enabling the preset mode in response to a trigger operation by the user on the first control.

13. The electronic device according to claim 12, wherein the first screen is a system desktop, and the displaying the first screen comprises:

displaying the system desktop in response to the trigger operation by the user, wherein the system desktop comprises a first prompt box, and the first prompt box comprises the first control; and enabling the preset mode in response to an enabling operation by the user on the first control.

14. The electronic device according to claim 10, wherein the outputting the alert information for the alerting the user of being tracked by the Bluetooth peripheral comprises:

popping up a first notification in a navigation bar of a second screen that is being displayed; and displaying the alert information in response to a pull-down operation by the user on the navigation bar.

15. The electronic device according to claim 14, wherein the alert information further comprises a second control, and the electronic device is further caused to perform:

after the displaying the alert information:

establishing a Bluetooth connection with the Bluetooth peripheral based on the physical address carried in the first Bluetooth signal in response to a trigger operation by the user on the second control; and controlling the Bluetooth peripheral to perform a function of alerting.

16. The electronic device according to claim 10, wherein the outputting the alert information for alerting the user of being tracked by the Bluetooth peripheral comprises:

controlling a motor of the electronic device to vibrate; or controlling a speaker of the electronic device to output an alert tone; or controlling a light indicator of the electronic device to blink; or when the alert information is a control command, sending the control command to a wearable device with which a communication connection has been established, to control the wearable device to vibrate or output the alert tone.

17. The electronic device according to claim 10, wherein the receiving the first Bluetooth signal through the first signal filter when it is detected that the moving state has changed comprises:

enabling a timer upon detecting that the moving state has changed;

receiving the first Bluetooth signal through the first signal filter; and stopping receiving the first Bluetooth signal upon expiration of the timer, wherein a timing duration of the timer is greater than a period during which the Bluetooth peripheral broadcasts the first Bluetooth signal.

18. An electronic device, comprising a memory, at least one central processing unit, and a computer program stored in the memory and capable of running on the at least one central processing unit, wherein when the computer program is executed by the at least one central processing unit, the electronic device is caused to perform:

receiving a first Bluetooth signal through a first signal filter when it is detected that a moving state has changed, wherein the first signal filter is configured to receive the first Bluetooth signal;

storing scanning records of a second type when the electronic device detects the first Bluetooth signal, wherein there is a correspondence between the scanning records of the second type and a physical address carried in the first Bluetooth signal;

outputting alert information for alerting a user of being tracked by a Bluetooth peripheral when a quantity of the scanning records of the second type corresponding to the physical address is greater than a first threshold, wherein the alert information further comprises a second control, and wherein the outputting the alert information for alerting the user of being tracked by the Bluetooth peripheral comprises:

popping up a first notification in a navigation bar of a second screen that is being displayed; and displaying the alert information in response to a pull-down operation by the user on the navigation bar; and after the displaying the alert information:

establishing a Bluetooth connection with the Bluetooth peripheral based on the physical address carried in the first Bluetooth signal in response to a trigger operation by the user on the second control; and controlling the Bluetooth peripheral to perform a function of alerting.

\* \* \* \* \*